United States Patent
Murade

(10) Patent No.: US 6,850,292 B1
(45) Date of Patent: Feb. 1, 2005

(54) ELECTRIC-OPTIC DEVICE, METHOD OF FABRICATING THE SAME, AND ELECTRONIC APPARATUS

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/601,360
(22) PCT Filed: Dec. 27, 1998
(86) PCT No.: PCT/JP99/07382
§ 371 (c)(1),
(2), (4) Date: Aug. 1, 2000
(87) PCT Pub. No.: WO00/39634
PCT Pub. Date: Feb. 6, 2000

(30) Foreign Application Priority Data

Dec. 28, 1998 (JP) .......................... 10-373588

(51) Int. Cl.[7] .............................. G02F 1/136
(52) U.S. Cl. ..................................... 349/44
(58) Field of Search ................... 349/44, 110

(56) References Cited

U.S. PATENT DOCUMENTS

| | | | |
|---|---|---|---|
| 5,708,485 A | * | 1/1998 | Sato et al. ............... 349/42 |
| 5,784,132 A | | 7/1998 | Hashimoto |
| 5,966,193 A | * | 10/1999 | Zhang et al. ............... 349/110 |
| 6,067,131 A | * | 5/2000 | Sato ............... 349/110 |
| 6,327,006 B1 | * | 12/2001 | Sato et al. ............... 349/44 |
| 6,449,022 B1 | * | 9/2002 | Fukata et al. ............... 349/44 |

FOREIGN PATENT DOCUMENTS

| | | |
|---|---|---|
| JP | 03-148636 | 6/1991 |
| JP | 05-203988 | 8/1993 |
| JP | 05-257164 | 10/1993 |
| JP | A 5-257164 | 10/1993 |
| JP | 08-122768 | 5/1996 |
| JP | A 8-122768 | 5/1996 |
| WO | WO00/39634 | 7/2000 |

* cited by examiner

Primary Examiner—Robert H. Kim
Assistant Examiner—P. R. Akkapeddi
(74) Attorney, Agent, or Firm—Oliff & Berridge, PLC

(57) ABSTRACT

In a TFT active matrix electro-optical device, the pixel-aperture ratio is increased while a pixel electrode and a semiconductor layer are interconnected, and a high resolution image can be displayed, with a relatively simple structure. For that purpose, the electro-optical device includes a TFT array substrate provided with a TFT, a data line, a scanning line, a capacitor line, and a pixel electrode. The pixel electrode and the TFT are electrically connected to each other, and are interconnected by a first barrier layer through contact holes. A second barrier layer is formed broader than the data line, and a portion of the second barrier layer overlaps the pixel electrode, and thus the pixel-aperture region is delimited.

26 Claims, 19 Drawing Sheets

ELECTRIC-OPTIC DEVICE, METHOD OF FABRICATING THE SAME, AND ELECTRONIC APPARATUS

BACKGROUND OF THE INVENTION

1. Fields of the Invention

The present invention belongs to the technical field relating to an electro-optical device and a method for fabricating the same. More particularly, the present invention belongs to the technical field relating to an electro-optical device provided with interconnecting electrode layers for satisfactorily maintaining electrical connections between pixel electrodes and thin-film transistors (hereinafter referred to as "TFTs") for switching pixels, a method for fabricating the same, and an electronic apparatus.

2. Description of Related Art

Conventionally, an electro-optical device generally includes an electro-optical material such as a liquid crystal enclosed between a pair of substrates. A TFT array substrate, as an example of one of the pair of substrates, is provided with a plurality of pixel electrodes formed in a matrix, and a counter substrate, as an example of the other substrate, is provided with a light-shielding film which is formed like a grid corresponding to the spaces between the pixel electrodes for delimiting a pixel-aperture region in each pixel (i.e., a region in which light passes through the electro-optical material in each pixel). In such a case, in order to prevent a decrease in the contrast ratio in the display image due to light leakage around the individual pixel electrodes, the grid light-shielding film is formed so as to slightly overlap the individual pixel electrodes in a plan view. Since the light-shielding film provided on the counter substrate side is relatively separated from the pixel electrodes with the electro-optical material, etc. therebetween, in consideration of light entering obliquely and a deviation in the alignment of both substrates, the pixel electrodes and the light-shielding film must overlap with a considerable margin. This hinders an increase in the pixel-aperture ratio (i.e., the ratio of the pixel-aperture region to the entire pixel region in each pixel).

Consequently, under the general requirement for displaying bright images, in order to increase the pixel-aperture ratio, a technique is generally employed in which in addition to the delimitation of the pixel-aperture regions by the light-shielding film on the counter substrate side, the individual pixel-aperture regions are partially delimited by forming data lines composed of a light-shielding material such as Al (aluminum) broadly so as to cover the longitudinal spaces between pixel electrodes. In accordance with this technique, since the pixel-aperture regions are partially delimited by the data lines, the pixel-aperture ratio can be increased.

On the other hand, in such an electro-optical device, although each pixel electrode and a switching element, such as a TFT, provided on each pixel must be connected to each other, a thick layered structure with a thickness of approximately 1,000 nm (nanometers) or more lies therebetween, which includes wiring such as scanning lines, capacitor lines, and data lines, and a plurality of interlayer insulating films for electrically insulating them from each other. Thereby, it is difficult to open a contact hole for electrically connecting the pixel electrode and the element to each other.

SUMMARY OF THE INVENTION

Under the general requirement for higher resolution of the display image in such an electro-optical device, refinement of the pixel pitch, improvement in the pixel-aperture ratio, and a stable supply of image signals to pixel electrodes are important.

However, in accordance with the technique in which the pixel-aperture region is partially delimited by the data lines, since the data lines and the pixel electrodes partially overlap with the interlayer insulating films therebetween, with respect to the TFT provided in each pixel, parasitic capacitance occurs between a source and a drain due to the overlap between the data line and the pixel electrode. Generally, the TFT to which image signals are supplied through the data line performs switching so that the pixel electrode retains a predetermined potential in response to image signals over a period of one frame. Since the data line is frequently fluctuated by the potential of image signals supplied to TFTs in other columns during this period, the TFT performs abnormally due to the parasitic capacitance between the source and drain, and thus a voltage to be retained by the pixel electrode leaks out. As a result, the supply of image signals to the pixel electrode becomes unstable, resulting in deterioration in the display image, which is disadvantageous.

On the other hand, under the general requirement for simplification of the structure of such an electro-optical device and cost reduction, it is important not to excessively increase the number of conductive layers and insulating films in the layered structure even when a new function is added or the existing function is improved, and to effectively use one film for performing a plurality of functions.

In view of the problems described above, it is an object of the present invention to provide an electro-optical device with a relatively simple structure having a high pixel-aperture ratio in which a high resolution image can be displayed, and to provide a method for fabricating the same.

In order to solve the problems described above, in accordance with the present invention, an electro-optical device includes a substrate, a plurality of scanning lines, a plurality of data lines, a thin-film transistor and a pixel electrode formed at the intersection between each of the scanning lines and each of the data lines, a light-shielding first conductive layer disposed between a semiconductor layer constituting a source region and a drain region of the thin-film transistor, and the pixel electrode, the first conductive layer being electrically connected to the semiconductor layer and electrically connected to the pixel electrode, and a second conductive layer, composed of the same film as that of the first conductive layer, at least partially overlapping the data lines in a plan view.

In accordance with the structure of the electro-optical device of the present invention, the first conductive layer is disposed between the semiconductor layer and the pixel electrode, is electrically connected to the semiconductor layer, and also is electrically connected to the pixel electrode. Consequently, the first conductive layer acts as an interconnecting conductive layer for electrically connecting the pixel electrode to the drain region of the semiconductor layer, and for example, it is possible to avoid the difficulty of directly connecting the pixel electrode and the semiconductor layer to each other through a contact hole.

Since the second conductive layer at least partially overlaps the data lines in a plan view, light-shielding for each pixel can be enhanced by the second conductive layer in addition to the data lines.

In the electro-optical device of the present invention, the second conductive layer may at least partially overlap the pixel electrode in a plan view.

In the above structure, the second conductive layer which is formed between adjacent pixel electrodes particularly at least partially overlaps the pixel electrodes in a plan view. Thereby, the pixel-aperture region in each pixel can be at least partially delimited by the portion of the second conductive layer which overlaps the pixel electrode. In such a case, at the section in which the pixel-aperture region is delimited by the second conductive layer, since there is no space between the pixel electrode and the second conductive layer in a plan view, light leakage does not occur through such a space. Consequently, the contrast ratio can be increased. At the same time, at the section in which the pixel-aperture region is delimited by the second conductive layer, since there is no need to delimit the pixel-aperture region by the data lines as has been done conventionally, it is also not required to overlap the data lines and the pixel electrodes. As a result, because of the structure in which the data lines and the pixel electrodes overlap with an interlayer insulating film therebetween, parasitic capacitance does not occur between the source and the drain of the thin-film transistor in each pixel. Therefore, it is possible to avoid the leakage of the voltage to be retained by the pixel electrode because of the abnormal operation of the thin-film transistor due to the parasitic capacitance between the source and the drain resulting from fluctuations in the potential of the data lines fluctuated by the potential of image signals supplied to thin-film transistors in other columns during a predetermined period, such as one frame. That is, the thin-film transistor performs switching so that the pixel electrode retains a predetermined potential in response to image signals, the image signals are stably supplied to the pixel electrode through the data line and the thin-film transistor, and as a result, higher resolution of a display image is enabled due to a decrease in flickering and line nonuniformity.

Furthermore, since the first conductive layer has a function of interconnecting the thin-film transistor and the pixel electrode and also the second conductive layer composed of the same film as that of the first conductive layer has a function of delimiting the pixel-aperture region while maintaining the stable supply of image signals, the layered structure and the fabrication process can be simplified, and cost reduction can be achieved.

In the electro-optical device of the present invention, preferably, the first conductive layer is electrically connected to the semiconductor layer through a first contact hole, and is electrically connected to the pixel electrode through a second contact hole.

In such a structure, in comparison with a case in which one contact hole is opened from the pixel electrode to the drain region of the semiconductor layer, the diameter of the contact hole can be decreased. That is, generally, as the contact hole is deepened, the etching accuracy is decreased, and thereby, in order to prevent the penetration through the thin semiconductor layer, the process must be arranged such that dry etching, which can decrease the diameter of the contact hole, is suspended and wet etching is then performed to open the hole to the semiconductor layer. Thereby, the diameter of the contact hole inevitably increases due to the wet etching lacking in directivity. In contrast, in the present invention, since the pixel electrode and the semiconductor layer are connected by two serial contact holes, i.e., the first contact hole and the second contact hole, each contact hole can be opened by dry etching, or at least the distance in which the hole is opened by wet etching can be shortened. Consequently, the diameter of each contact hole can be decreased, and the planarization of the portion of the pixel electrode lying above the first contact hole or the second contact hole is promoted.

In the electro-optical device of the present invention, preferably, the data line is electrically connected to the semiconductor layer through a third contact hole.

In such a structure, it is possible to satisfactorily obtain electrical connection between the data line and the source region of the semiconductor layer through the third contact hole.

In the electro-optical device of the present invention, preferably, the data line does not at least partially overlap the pixel electrode in a plan view.

In such a structure, by forming the data line so as not to overlap the pixel electrode as much as possible, in comparison with a case in which the data line is formed so as to overlap the pixel electrode, the parasitic capacitance between the data line and the pixel electrode can be securely reduced. Consequently, in particular, the voltage in the pixel electrode is stabilized, thus enabling a decrease in flickering and line nonuniformity.

Furthermore, defects such as electrical short-circuiting between the data line and the pixel electrode, that are highly likely to occur at the section in which the data line overlaps the pixel electrode with the interlayer insulating film therebetween, can be prevented from occurring, and thereby the defect rate of the device can be decreased and the yield during the fabrication can be improved.

In the electro-optical device of the present invention, the second conductive layer may be electrically connected to a constant-potential line.

In such a structure, although slight parasitic capacitance occurs between the pixel electrode and the second conductive layer which at least partially overlap, the potential of the second conductive layer remains constant. Therefore, it is possible to reduce an adverse influence brought to the potential of the pixel electrode by a change in the potential of the second conductive layer through the parasitic capacitance between the pixel electrode and the second conducive layer, and the voltage at the pixel electrode is further stabilized, resulting in a further decrease in flickering and line nonuniformity.

The electro-optical device of the present invention may further include a light-shielding film formed on the substrate side of at least a channel region of the semiconductor layer, with an underlying insulating film therebetween.

In such a structure, by the light-shielding film formed on the substrate side of at least the channel region of the semiconductor layer, the channel region can be shielded from light entering from the side of the TFT array substrate. Therefore, when the electro-optical device is operated, light leakage at the channel region, resulting from light irradiation to the thin-film transistor, such as projected light, back-side reflected light, and reflected light, can be reduced, and thus, a change in characteristics and the deterioration of the thin-film transistor can be reduced, and also a high-resolution image can be displayed.

In the electro-optical device of the present invention, preferably, the first conductive layer and the second conductive layer contain a high-melting point metal.

In such a structure, the first conductive layer and the second conductive layer are composed of an elemental metal, an alloy, a metal silicide, or the like containing, for example, at least one metal selected from the group consisting of Ti (titanium), Cr (chromium), W (tungsten), Ta (tantalum), Mo (molybdenum), and Pb (lead). Therefore, the first conductive layer and the second conductive layer are not deformed or damaged by high-temperature treatment in various steps after the first conductive layer and the second conductive layer are formed during the fabrication process.

In the electro-optical device of the present invention, preferably, the second conductive layer and the data line are at least partially disposed opposite to each other with an interlayer insulating film therebetween.

In such a structure, since the capacitance is added to the data line, not between the data line and the pixel electrode in which the potential varies in response to image signals to be retained, but between the data line and the second conductive layer in which the potential is more stabilized, it is possible to increase the capacitance appropriately while preventing fluctuations in the potential of the data line. In particular, even if the pixel pitch is greatly reduced and accordingly the width of the data line is greatly reduced, by increasing the capacitance between the data line and the second conductive layer, insufficient capacitance of the data line can be prevented, and insufficient writing capacitance in supplying image signals to the pixel electrode through the data line can be avoided The electro-optical device of the present invention may further include a storage capacitor connected to the pixel electrode.

In such a structure, the period of time for retaining the voltage of image signals in the pixel electrode can be greatly increased, and the contrast ratio can be increased very effectively.

In this case, the first conductive layer and the second conductive layer may be provided on the scanning line and one of the electrodes of the storage capacitor with an insulating film therebetween.

In this structure, the pixel electrode and the semiconductor layer can be interconnected by the first conductive layer provided on the scanning line and one of the electrodes of the storage capacitor with the insulating film therebetween, and the pixel-aperture region can be delimited by the second conductive layer provided on the scanning line and one of the electrodes of the storage capacitor with the insulating film therebetween, and furthermore capacitance can be easily formed between the second conductive layer and one of the electrodes of the storage capacitor.

In the structure further provided with the storage capacitor, a first storage capacitor electrode which may consist of a portion of the semiconductor layer and a second storage capacitor electrode as one of the electrodes of the storage capacitor may be disposed opposite to each other with a first dielectric film therebetween, and the second storage capacitor electrode and a third storage capacitor electrode which may consist of a portion of the first conductive layer may be disposed opposite to each other with a second dielectric film as the insulating film therebetween.

In such a structure, the first storage capacitor electrode which may consist of the portion of the semiconductor layer and the second storage capacitor electrode as one of the electrodes of the storage capacitor are disposed opposite to each other with the first dielectric film therebetween, and thus a first storage capacitor is constructed Also, the second storage capacitor electrode and the third storage capacitor electrode which may consist of the portion of the first conductive layer are disposed opposite to each other with the second dielectric film therebetween, and thus a second storage capacitor is constructed. Since the first storage capacitor and the second storage capacitor constitute a storage capacitor in each pixel-electrode, a storage capacitor with relatively large capacitance can be constructed by effectively using the pixel-closed region, and also by using the three-dimensional structure.

In the structure provided with the storage capacitor, the second conductive layer may be connected to the second storage capacitor electrode.

In such a structure, although parasitic capacitance is slightly added between the pixel electrode and the second conductive layer which at least partially overlap, the second conductive layer maintains the same potential as that of the second storage capacitor electrode.

When the second conductive layer is connected to the second storage capacitor electrode, the second conductive layer may be connected to the second storage capacitor electrode through a fourth contact hole, and the fourth contact hole may be opened in the same step as that of opening the first contact hole.

In such a structure, the second conductive layer can be relatively easily connected to the second storage capacitor electrode, and moreover, since the first contact hole and the fourth contact hole are opened simultaneously, the fabrication process is simplified.

The second storage capacitor electrode may extend to form a capacitor line.

In such a structure, the capacitor line has a constant potential or has at least large capacitance and the change in the potential is decreased. Therefore, it is possible to reduce an adverse influence brought to the potential of the pixel electrode by a change in the potential of the second conductive layer through the parasitic capacitance between the pixel electrode and the second conductive layer.

The second storage capacitor electrode may be connected to the light-shielding film.

In such a structure, the second storage capacitor electrode and the light-shielding film can have the same potential, and if one of the second storage capacitor electrode and the light-shielding film is constructed so as to have a predetermined potential, the other can have the predetermined potential. Consequently, an adverse influence due to fluctuations in the potential of the second storage capacitor electrode and the light-shielding film can be reduced. The wiring comprising the light-shielding film and the capacitor line can be set to mutually function as a redundant wiring.

The light-shielding film may also act as the capacitor line, and the planar shape of the second storage capacitor electrode on the substrate may extend along the scanning line between the adjacent data lines, and the second storage capacitor electrode may be shaped like an island for each pixel electrode, and may be connected to the light-shielding film.

In such a structure, since the second storage capacitor electrode can be shaped like an island for each pixel electrode, the pixel-aperture ratio can be increased. If the second storage capacitor is also used as a wiring, the redundant wiring of the capacitor line can be formed together with the light-shielding film.

Furthermore, the light-shielding film may be electrically connected to the capacitor line through a fifth contact hole opened at a planar position different form that of the fourth contact hole.

In such a structure, the channel region can be shielded from light entering from the side of the substrate by the light-shielding film formed at least on the substrate side of the channel region of the semiconductor layer. Moreover, since the light-shielding film is conductive and is connected to the capacitor line through the fifth contact hole, the light-shielding film can be used as the redundant wiring of the capacitor line. By reducing the resistance of the capacitor line, the potential of the capacitor line is further stabilized, and as a result, higher resolution of a display image can be obtained. By making the fourth contact hole and the fifth contact hole at different planar positions, poor connections at the fourth contact hole and the fifth contact hole can be avoided.

Furthermore, the second conductive layer and the light-shielding film may be electrically connected to each other through the second storage capacitor electrode, and the second conductive layer and the light-shielding film may be connected to the adjacent pixel electrodes.

In such a structure, the second conductive layer can be used as the capacitor line. By using the second storage capacitor electrode as the capacitor line and by connecting the second conductive layer and the second storage capacitor electrode to each other, the capacitor line can be formed in duplicate, enabling a redundant structure.

In the electro-optical device of the present invention, preferably, the first conductive layer and the second conductive layer are provided below the data line.

In such a structure, the pixel electrode and the semiconductor layer can be interconnected by the first conductive layer provided below the data line, and the pixel-aperture region can be delimited by the second conductive layer provided below the data line, and also capacitance can be easily formed between the first conductive layer and the second storage capacitor electrode.

In the electro-optical device of the present invention, preferably, the second conductive layer is shaped like an island in a plan view and at least partially delimits a region along the data line in the pixel-aperture region.

In such a structure, by the second conductive layer shaped like an island in a plan view, the region along the data line in the pixel-aperture region can be at least partially delimited. For example, in most of the region along the data line, excluding the channel region of the thin-film transistor and the region in which a contact hole for connecting the data line and the semiconductor layer is opened, the second conductive layer can be formed, and the pixel-aperture region in most of the region can be delimited by the second conductive layer.

Alternatively, in the electro-optical device of the present invention, preferably, the first conductive layer and the second conductive layer are provided as layers which are more distant from the substrate in comparison with the data line, namely, above the data line.

In such a structure, by the first conductive layer provided as the layer which is more distant from the substrate in comparison with the data line, the pixel electrode and the semiconductor layer can be interconnected, and by the second conductive layer provided above the data line, the pixel-aperture region can be delimited. In such a case, in particular, the second conductive layer may be provided in the entire region on the data line with an interlayer insulating film therebetween, or may be provided on the scanning line with an interlayer insulating film therebetween. Since the contact hole for connecting the first conductive layer and the pixel electrode can be positioned at any position within the closed region, freedom of design is enhanced, which is advantageous.

In this case, the second conductive layer may be formed like a grid excluding the region in which the first conductive layer is present in a plan view, so that regions along the data line and the scanning line in the pixel-aperture region are delimited.

In such a structure, since the second conductive layer is provided like a grid excluding the region in which the first conductive layer is present, the regions along the individual data lines and scanning lines in the pixel-aperture region can be delimited, namely, the whole outline of the pixel-aperture region can be delimited. Additionally, with respect to the space between the first conductive layer and the second conductive layer, light leakage can be easily prevented, for example, by the light-shielding film on the side of the counter substrate, the thin-film transistor on the lower side, an extended portion of the data line, and the like.

In the structure in which the first conductive layer and the second conductive layer are provided above the data line, the semiconductor layer and the first conductive layer may be connected to each other with an interconnecting conductive layer composed of the same film as that of the data line therebetween.

In such a structure, since the pixel electrode and the interconnecting conductive layer composed of the same film as that of the data line are electrically connected to each other by the first conductive layer provided above the data line, and the interconnecting conductive layer is further electrically connected to the semiconductor layer, the pixel electrode and the semiconductor layer can be satisfactorily interconnected by the two interconnecting conductive layers, i.e., the first conductive layer and the interconnecting conductive layer. In particular, even when an Al film constituting the data line and an ITO (indium tin oxide) film constituting the pixel electrode are electrically incompatible, the incompatibility can be overcome by forming the first conductive layer with a material which is electrically compatible with both materials (e.g., a high-melting point metal), which is advantageous.

The structure in which the first conductive layer and the second conductive layer are provided above the data line may include a storage capacitor connected to the pixel electrode, and the data line may be sandwiched between one of the electrodes of the storage capacitor and the second conductive layer with an interlayer insulating film therebetween.

In such a structure, since capacitance can be added to the data line, not between the data line and the pixel electrode in which the potential varies in response to image signals to be retained, but between the data line and the second conductive layer in which the potential is more stabilized as well as one of the electrodes of the storage capacitor, it is possible to increase the capacitance of the data line appropriately while preventing fluctuations in the potential. In particular, even if the pixel pitch is greatly reduced and accordingly the width of the data line is greatly reduced, by increasing the capacitance between the data line and the second conductive layer as well as the second storage capacitor electrode, insufficient capacitance of the data line can be prevented, and insufficient writing capacitance in supplying image signals to the pixel electrode through the data line can be avoided.

In order to solve the problems described above, in accordance with a first method for fabricating an electro-optical device of the present invention, the method for fabricating the electro-optical device including a substrate, a plurality of scanning lines, a plurality of data lines, a thin-film transistor connected to each of the scanning lines and each of the data lines, and a pixel electrode connected to the thin-film transistor, includes the steps of forming a semiconductor layer for producing a source region, a channel region, and a drain region on the substrate; forming an insulating thin film on the semiconductor layer, forming the scanning lines and one of the electrodes of a storage capacitor in a predetermined region on the insulating thin film; forming a first interlayer insulating film on the scanning lines and one of the electrodes; making a first contact hole leading to the semiconductor layer in the insulating thin film and the first interlayer insulating film; forming a light-shielding first conductive layer on the first insulating film so as to be electrically connected to the semiconductor layer through the first contact hole and forming a second conductive layer composed of the same film as that of the first conductive layer; forming a second interlayer insulating film on the first conductive layer and the second conductive layer; forming the data lines on the second interlayer insulating film, forming a third interlayer insulating film on the data lines; making a second contact hole leading to the first conductive layer in the second interlayer insulating film and the third interlayer insulating film; and forming the pixel electrode so as to be electrically connected to the first conductive layer through the second contact hole. The second conductive layer is formed so as to at least partially overlap the data lines in a plan view.

In accordance with the first method for fabricating the electro-optical device of the present invention, the semiconductor layer, the insulating thin film, the scanning lines, one of the electrodes of the storage capacitor, and the first interlayer insulating film are deposited on the substrate in that sequence. Next, the first contact hole leading to the semiconductor layer is made in the insulating thin film and the first interlayer insulating film, and the light-shielding first conductive layer is formed so as to be electrically connected to the semiconductor layer through the first contact hole. Simultaneously, using the same film as that of the first conductive layer, the second conductive layer is formed so as to be at least partially disposed within a space in the region in which the pixel electrode is formed in a plan view. The second interlayer insulating film, the data lines, and the third interlayer insulating film are then deposited in that sequence. Next, the second contact hole leading to the first conductive layer is made, and the pixel electrode is formed so as to be electrically connected to the first conductive layer through the second contact hole. Therefore, the electro-optical device of the present invention having the structure in which the first and the second conductive layers are formed as layers closer to the substrate in comparison with the data lines and the pixel electrode and the semiconductor layer are interconnected by the second conductive layer through two contact holes can be fabricated relatively easily. In particular, since the first conductive layer and the second conductive layer are formed of the same film, the fabrication process can be simplified, and cost reduction can be achieved.

The first method for fabricating the electro-optical device of the present invention may further include the step of making a third contact hole leading to the semiconductor layer in the second interlayer insulating film after the step of forming the second interlayer insulating film; in the step of forming the data lines, the data lines may be formed so as to be electrically connected to the semiconductor layer through the third contact hole; in the step of making the first contact hole, a fourth contact hole leading to one of the electrodes of the storage capacitor may be made in the first interlayer insulating film simultaneously with the making of the first contact hole; and in the step of forming the second conductive layer, the second conductive layer may be formed so as to be electrically connected to one of the electrodes of the storage capacitor through the fourth contact hole.

In such a structure, after the second interlayer insulating film is formed, the third contact hole leading to the semiconductor layer is made, and the data line is formed so as to be electrically connected to the semiconductor layer through the third contact hole. Furthermore, when the first contact hole is made, the fourth contact hole leading to one of the electrodes of the storage capacitor is simultaneously made, and the second conductive layer is formed so as to be electrically connected to one of the electrodes of the storage capacitor through the fourth contact hole. Therefore, the electro-optical device of the present invention having the structure in which the data line and the semiconductor layer are electrically connected to each other through a contact hole and the second conductive layer and one of the electrodes of the storage capacitor are electrically connected to each other through a contact hole can be fabricated relatively easily. In particular, since the two contact holes are simultaneously made, the fabrication process can be simplified, and cost reduction can be achieved.

In order to solve the problems described above, in accordance with a second method for fabricating an electro-optical device of the present invention, the method for fabricating the electro-optical device including a substrate, a plurality of scanning lines, a plurality of data lines, a thin-film transistor connected to each of the scanning lines and each of the data lines, and a pixel electrode connected to the thin-film transistor, includes the steps of forming a semiconductor layer for producing a source region, a channel region, and a drain region on the substrate; forming an insulating thin film on the semiconductor layer, forming the scanning lines and one of the electrodes of a storage capacitor on the insulating thin film; forming a first interlayer insulating film on the scanning lines and one of the electrodes of the storage capacitor; making a first contact hole leading to the semiconductor layer in the first interlayer insulating film; forming the data lines on the first interlayer insulating film and simultaneously forming an interconnecting conductive layer composed of the same film as that of the data lines so as to be electrically connected to the semiconductor layer through the first contact hole; forming a second interlayer insulating film on the data lines and the interconnecting conductive layer; making a second contact hole leading to the interconnecting conductive layer in the second interlayer insulating film; forming a light-shielding first conductive film on the second interlayer insulating film so as to be electrically connected to the interconnecting conductive layer through the second contact hole, and simultaneously forming a second conductive layer composed of the same film as that of the first conductive layer so as to two-dimensionally overlap the data lines; forming a third interlayer insulating film on the first conductive layer and the second conductive layer, making a third contact hole leading to the first conductive layer in the third interlayer insulating film; and forming the pixel electrode so as to be electrically connected to the first conductive layer through the third contact hole.

In accordance with the second method for fabricating the electro-optical device of the present invention, the semiconductor layer, the insulating thin film, the scanning lines, one of the electrodes of the storage capacitor, and the first interlayer insulating film are deposited on the substrate in that sequence. Next, the contact hole leading to the semiconductor layer is made, and the data lines are formed, and simultaneously the interconnecting conductive layer composed of the same film as that of the data lines is formed so as to be electrically connected to the semiconductor layer. Next, after the second interlayer insulting film is formed, the contact hole leading to the interconnecting conductive layer is made, and the light-shielding first conductive layer is formed so as to be electrically connected to the interconnecting conductive layer. Simultaneously, the second conductive layer composed of the same film as that of the first conductive layer is formed. The third interlayer insulating film is then formed, the contact hole leading to the first conductive layer is opened, and the pixel electrode is formed so as to be electrically connected to the first conductive layer. Therefore, the electro-optical device of the present invention can be fabricated relatively easily in which the interconnecting conductive layer is formed as the conductive layer composed of the same film as that of the data lines, the first conductive layer is formed as the layer more distant from the substrate in comparison with the data lines, i.e., as the layer above the data lines, the pixel electrode and the semiconductor layer are connected by the interconnecting conductive layer and the first conductive layer through three contact holes, and the pixel-aperture region is delimited by the second conductive layer. In particular, since the first conductive layer and the second conductive layer are composed of the same film, the fabrication process can be simplified, and cost reduction can be achieved.

The second method for fabricating the electro-optical device of the present invention may further include the step of making a fourth contact hole leading to the semiconductor layer in the first interlayer insulating film after the step of forming the first interlayer insulating film; in the step of forming the data lines, the data lines may be formed so as to be electrically connected to the semiconductor layer through the fourth contact hole; in the step of making the second contact hole, a fifth contact hole leading to one of the electrodes of the storage capacitor may be made in the first interlayer insulating film and in the second interlayer insulating film simultaneously with the making of the second contact hole; and in the step of forming the second conductive layer, the second conductive layer may be formed so as to be electrically connected to one of the electrodes of the storage capacitor through the fifth contact hole.

In such a structure, after the first interlayer insulating film is formed, the fourth contact hole leading to the semiconductor layer is made, and the data lines are formed so as to be electrically connected to the semiconductor layer. Furthermore, when a contact hole is made in the second interlayer insulating film, a contact hole leading to one of the electrodes of the storage capacitor is simultaneously made, and the third conductive layer is formed so as to be electrically connected to one of the electrodes of the storage capacitor. Therefore, the electro-optical device can be relatively easily fabricated, in which the data line and the semiconductor layer are electrically connected to each other through a contact hole and the second conductive layer and one of the electrodes of the storage capacitor are electrically connected to each other through a contact hole. In particular, since the two contact holes are simultaneously made, the fabrication process can be simplified and cost reduction can be achieved.

The operation described above and other advantages of the present invention will be clarified by the embodiments described below.

DETAILED DESCRIPTION OF THE EMBODIMENTS

The embodiments of the present invention will be described with reference to the drawings.

First Embodiment

Figure 1:
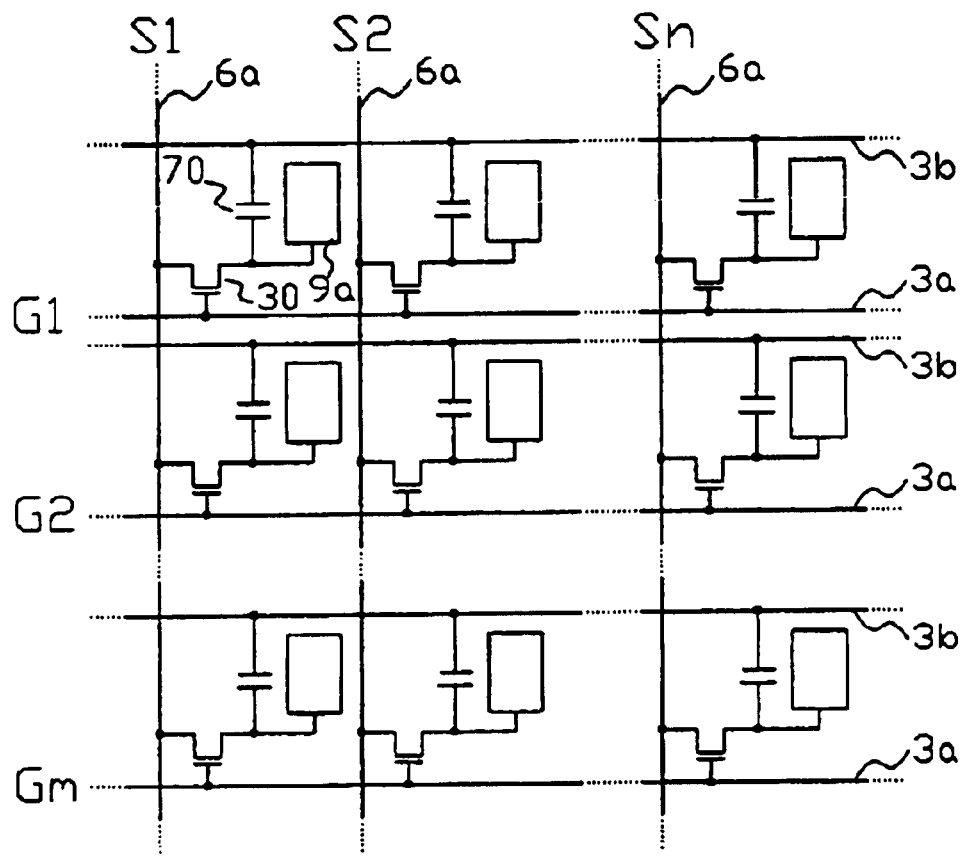
FIG. 1 is an equivalent circuit diagram showing various elements, wirings, etc. provided on a plurality of pixels formed in a matrix which constitute an image display area of an electro-optical device in a first embodiment.
Figure 2:
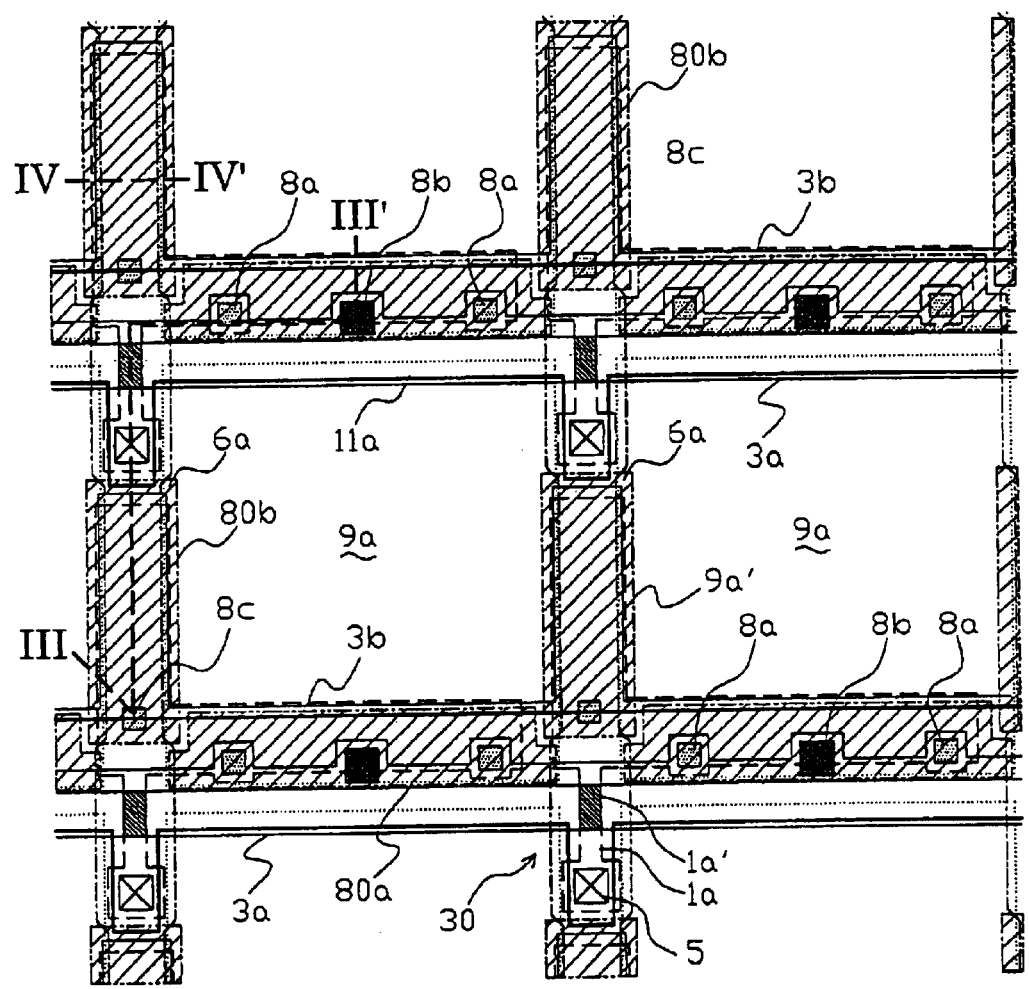
FIG. 2 is a plan view of a plurality of adjacent pixels in a TFT array substrate provided with data lines, scanning lines, pixel electrodes, etc. in the electro-optical device of the first embodiment.
Figure 3:
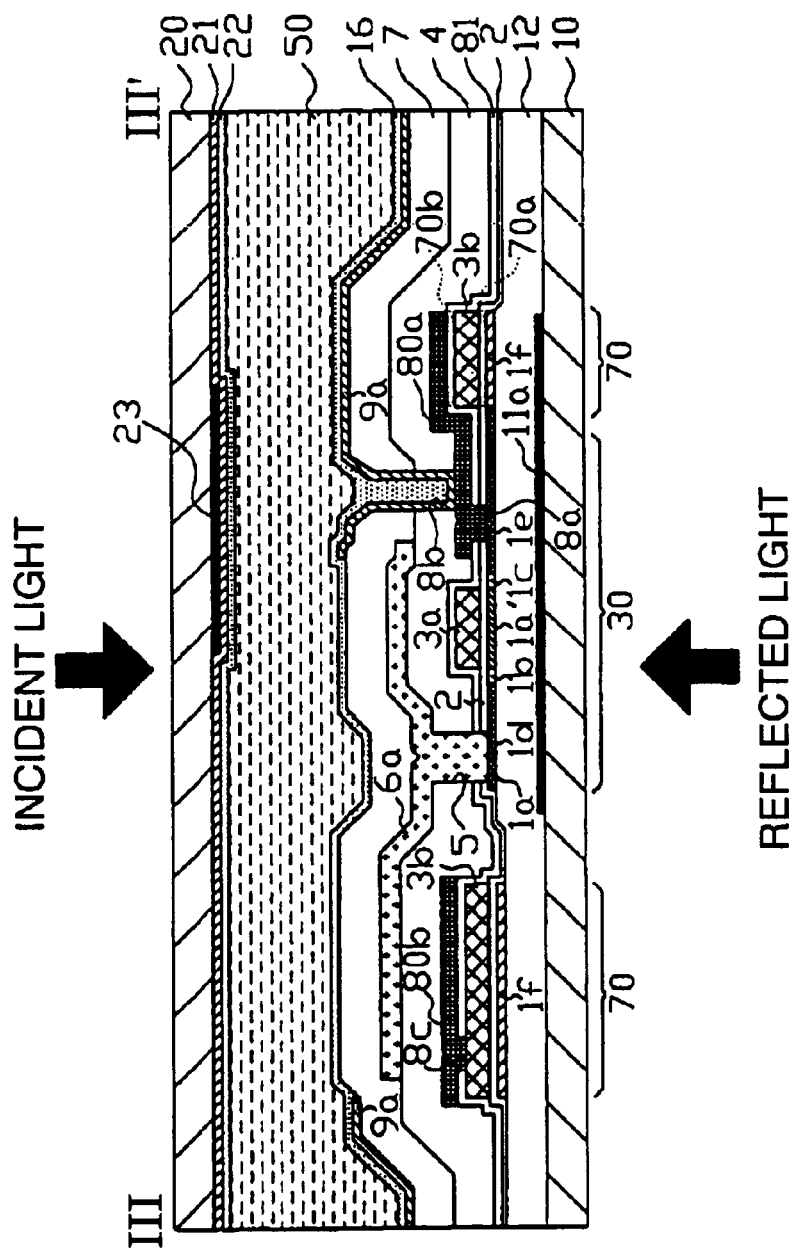
FIG. 3 is a sectional view taken along the line III–III' of FIG. 2.
Figure 4:
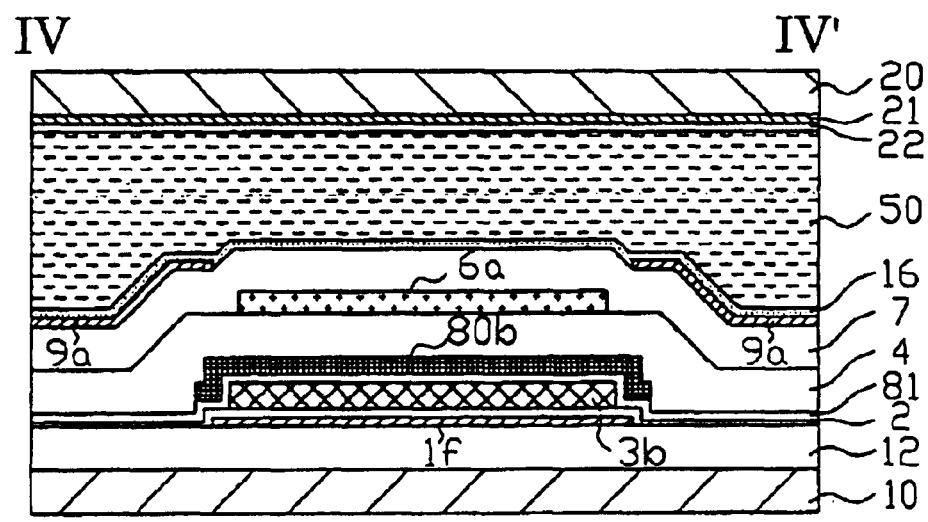
FIG. 4 is a sectional view taken along the line IV–IV' of FIG. 2.

The structure of an electro-optical device in a first embodiment of the present invention will be described with reference to FIGS. 1 to 4. FIG. 1 is an equivalent circuit diagram showing various elements, wirings, etc., provided at a plurality of pixels formed in a matrix which constitute an image display area of the electro-optical device. FIG. 2 is a plan view of a plurality of adjacent pixels in a TFT array substrate provided with data lines, scanning lines, pixel electrodes, etc. FIG. 3 is a sectional view taken along the line III–III' of FIG. 2. FIG. 4 is a sectional view taken along the line IV–IV' of FIG. 2. Additionally, in FIGS. 3 and 4, in order to make the individual layers and the individual elements recognizable in the drawings, different scales are used for the individual layers and the individual elements.

In FIG. 1, a plurality of pixels formed in a matrix constituting an image display area of the electro-optical device in this embodiment include a plurality of TFTs 30 for controlling pixel electrodes 9a formed in a matrix corresponding to the intersections between scanning lines 3a and data lines 6a. The data lines 6a to which image signals are supplied are electrically connected to the sources of the corresponding TFrs 30. Image signals S1, S2, . . . Sn to be written to the data lines may be supplied line-by-line, in sequence, or may be supplied to a plurality of adjacent data lines 6a by group. The scanning lines 3a are electrically connected to the gates of the TFTs 30, and pulsed scanning signals G1, G2, . . . Gm are applied to the scanning lines 3a line-by-line, in sequence, with a predetermined timing. The pixel electrodes 9a are electrically connected to the drains of the TFTs 30, and the image signals S1, S2, . . . Sn are written with a predetermined timing by switching off the TFTs 30 as switching elements for a predetermined period of time. The image signals S1, S2, . . . Sn having predetermined levels, which have been written to a liquid crystal, as an example of an electro-optical material, through the pixel electrodes 9a are retained for a predetermined period of time between the pixel electrodes 9a and a counter electrode (which will be described below) formed on a counter substrate (which will be described below). The liquid crystal modulates light by changes in the alignment and order of molecular self-assembly, depending on the level of an applied voltage, and thus gray scale can be displayed. In a "normally-white mode", incident light is not allowed to pass through the liquid crystal portion in response to the applied voltage, and in a "normally-black mode", incident light is allowed to pass through the liquid crystal portion in response to the applied voltage. Consequently, light having contrast in response to image signals is emitted from the electro-optical device. In order to prevent the leakage of the retained image signals, a storage capacitor 70 is added in parallel to liquid crystal capacitance between the pixel electrode 9a and the counter electrode. For example, the voltage of the pixel electrode 9a is retained by the storage capacitor 70 for a period of time three orders of magnitude longer than the period of time in which image signals are applied to the source of the TFT 30. Thereby, data retentivity is further improved, and the electro-optical device having a high contrast ratio is obtainable.

In FIG. 2, on the TFT array substrate of the electro-optical device, a plurality of transparent pixel electrodes 9a (outlined by a dotted line 9a') are formed in a matrix, and data lines 6a, scanning lines 3a, and capacitor lines 3b are formed along the vertical and horizontal boundaries of the pixel electrodes 9a. The data line 6a is electrically connected to a source region (which will be described below) of a semiconductor layer 1a, for example, composed of a polysilicon film, through a contact hole 5. In the regions along the scanning lines 3a and the regions along the data lines 6a (regions represented by lines slanting to the right in the drawing) in the spaces between adjacent pixel electrodes 91, island-like first conductive layers (hereinafter referred to as "first barrier layers") 80a and second conductive layers (hereinafter referred to as "second barrier layers") 80b are provided, respectively. In this embodiment, the first barrier layer 80a and the second barrier layer 80b are composed of the same light-shielding conductive film. The pixel electrode 9a is interconnected by the first barrier layer 80a, and is electrically connected to a drain region (which will be described below) of the semiconductor layer 1a through a contact hole 8a and a contact hole 8b. The capacitor line 3b is electrically connected to the second barrier layer 80b through a contact hole 8c. The scanning line 3a is arrayed so as to face a channel region 1a' (represented by lines slanting to the left in the drawing), and the scanning line 3a acts as a gate electrode. As described above, at each of the intersections between the scanning lines 3a and the data lines 6a, a TFT 30 for pixel-switching is provided in which the scanning line 3a as the gate electrode is disposed opposite to the channel region 1a'.

The capacitor line 3b includes a main-line portion which extends substantially linearly along the scanning line 3a and a protruding portion which protrudes at the intersection with the data line 6a along the data line 6a.

The first barrier layer 80a is electrically connected to the drain region of the semiconductor layer 1a by the contact hole 8a, and is electrically connected to the pixel electrode 9a by the contact hole 8b, and thus functions as a buffer between the drain region of the semiconductor layer 1a and the pixel electrode 9a The first barrier layer 80a, the contact hole 8a, and the contact hole 8b will be described in detail below.

Additionally, in the regions represented by bold lines in the drawing, a first light-shielding film 11a may be formed so as to pass below the scanning lines 3a, the capacitor lines 3b, and TFTs 30. Preferably, the first light-shielding film 11a is formed in a striped pattern along the scanning lines 3a and is formed broadly (downward in the drawing) at the intersections with the data lines 6a so that the broad portions cover the channel regions 1a' of the TFTs 30 for pixel-switching when viewed from the side of the TFT array substrate.

Next, as shown in the sectional view in FIG. 3, the electro-optical device includes a TFT array substrate 10, which is an example of one transparent substrate, and a counter substrate 20 disposed opposite thereto, which is an example of another transparent substrate. The TFT array substrate 10 is composed of, for example, a quartz substrate, a glass substrate, or a silicon substrate, and the counter substrate 20 is composed of, for example, a glass substrate or a quartz substrate. The pixel electrodes 9a are provided on the TFT array substrate 10, and an alignment layer 16 which is subjected to predetermined alignment treatment, such as rubbing, is provided thereon. The pixel electrode 9a is composed of, for example, a transparent conductive thin film such as an ITO film. The alignment layer 16 is composed of, for example, an organic thin film, such as a polyimide thin film.

On the other hand, a counter electrode 21 is formed over the entire surface of the counter substrate 20, and an alignment layer 22 which is subjected to predetermined alignment treatment such as rubbing is provided under the counter electrode 21. The counter electrode 21 is composed of, for example, a transparent conductive thin film, such as an ITO film. The alignment layer 22 is composed of an organic thin film, such as a polyimide thin film.

On the TFT array substrate 10, the TFT 30 for pixel-switching for controlling the switching of each pixel electrode 9a is provided at a position adjacent to each pixel electrode 9a.

As shown in FIG. 3, the counter substrate 20 is further provided with a second light-shielding film 23 in the covered region of each pixel. Thereby, incident light from the side of the counter substrate 20 does not enter into the channel region 1a', a low-concentration source region 1b, and a low-concentration drain region 1c of the semiconductor layer 1a of the TFT 30 for pixel-switching. The second light-shielding film 23 also improves contrast and prevents the mixture of colored materials when a color filter is formed.

A liquid crystal layer 50 is formed by injecting a liquid crystal as an example of an electro-optical material into a gap enclosed by a sealant (which will be described below) between the TFT array substrate 10 and the counter substrate 20 in which the pixel electrodes 9a and the counter electrode 21 are disposed so as to be opposed to each other.

The liquid crystal layer 50 is aligned in a predetermined state by the alignment layers 16 and 22 in the absence of an applied electric field from the pixel electrode 9a. The liquid crystal layer 50 is composed of, for example, a nematic liquid crystal or a liquid crystal in which several types of nematic liquid crystals are mixed. The sealant is an adhesive composed of, for example, a photosetting resin or a thermosetting resin, for bonding the TFT array substrate 10 and the counter substrate 20 together at the periphery thereof. A gap material composed of glass fibers, glass beads, or the like is mixed in the sealant in order to set the distance between the two substrates to a predetermined value.

Furthermore, as shown in FIG. 3, preferably, the first light-shielding film 11a is provided so as to face each TFT 30 for pixel-switching between the TFT array substrate 10 and each pixel-switching TFT 30. The light-shielding film 11a is preferably composed of an elemental metal, an alloy, a metal silicide, or the like containing at least one opaque high-melting point metal selected from the group consisting of Ti, Cr, W, Ta, Mo, and Pb. By using such a material, the first light-shielding film 11a is not damaged or melted by high-temperature treatment in the step of forming the TFT 30 for pixel-switching following the step of forming the first light-shielding film 11a on the TFT array substrate 10. Because of the formation of the first light-shielding film 11a, the reflected light (returned light) and the like from the side of the TFT array substrate 10 are prevented from entering into the channel region 1a', the low-concentration source region 1b, and the low-concentration drain region 1c, and the characteristics of the TFT 30 for pixel-switching do not change or deteriorate due to the occurrence of an electric current due to such light.

Additionally, the first light-shielding film 11a which is formed in a striped pattern may be extended, for example, below the scanning line 3a and be electrically connected to a constant potential line. In such a structure, a change in the potential of the first light-shielding film 11a does not adversely affect the TFT 30 for pixel-switching which is disposed opposite to the first light-shielding film 11a. In such a case, as the constant potential line, a constant potential line such as a negative power source or a positive power source to be supplied to a peripheral circuit (e.g., a scanning line drive circuit and a data line drive circuit) for driving the electro-optical device, a grounded power source, a constant potential line to be supplied to the counter electrode 21, or the like may be used. Additionally, the first light-shielding film 11a may be formed like a grid along the data lines 6a and the scanning lines 3a, or may be formed like an island so as to cover at least the channel region 1a', the low-concentration source region 1b, and the low-concentration drain region 1c of the TFT 30 for pixel-switching.

Furthermore, an underlying insulating film 12 is provided between the first light-shielding film 11a and the plurality of TFTs 30 for pixel-switching. The underlying insulating film 12 is provided in order to electrically insulate the semiconductor layer 1a constituting the TFT 30 for pixel-switching from the first light-shielding film 11a. The underlying insulating film 12 also functions as an underlying layer for the TFT 30 for pixel-switching by being formed over the entire surface of the TFT array substrate 10. That is, the underlying insulating film 12 prevents the deterioration of the characteristics of the TFT 30 for pixel-switching due to roughness caused by the polishing of the surface of the TFT array substrate 10 and stains remaining after cleaning. The underlying insulating film 12 is composed of, for example, highly insulating glass such as NSG (non-doped silicate glass), PSG (phosphosilicate glass), BSG (borosilicate glass), and BPSG (borophosphosilicate glass), a silicon oxide film, or a silicon nitride film. The underlying insulating film 12 also prevents the first light-shielding film 11a from contaminating the TFT 30 for pixel-switching, etc.

In this embodiment, the semiconductor layer 1a extends from the high-concentration drain region 1e to form a first storage capacitor electrode 1f, a portion of the capacitor line 3b opposite thereto is treated as a second storage capacitor electrode, and an insulating thin film 2 including the gate insulating film extends from the position facing the scanning line 3a to form a first dielectric film sandwiched between the electrodes, and thus a first storage capacitor 70a is constructed. Furthermore, a portion of the first barrier layer 80a facing the second storage capacitor electrode is treated as a third storage capacitor electrode, and a first interlayer insulating film 81 is provided between the electrodes. The first interlayer insulating film 81 acts as a second dielectric film, and thus a second storage capacitor 70b is formed. The first storage capacitor 70a and the second storage capacitor 70b are connected in parallel through the contact hole 8a, and thus a storage capacitor 70 is constructed. In particular, since the insulating thin film 2 as the first dielectric film of the first storage capacitor 70a is none other than the gate insulating film of the TFT 30 formed on a polysilicon film by high-temperature oxidation, a thin insulating film which can withstand high pressure can be obtained, and thus the first storage capacitor 70a can be constructed as a storage capacitor having large capacitance with a relatively small area. Since the first interlayer insulating film 81 can also be formed as thin as, or thinner than, the insulating thin film 2, the second storage capacitor 70b can be constructed as a storage capacitor having large capacitance with a relatively small area. Therefore, the storage capacitor 70 three-dimensionally constructed by the first storage capacitor 70a and the second storage capacitor 70b becomes a storage capacitor having large capacitance with a small area by effectively using a space excluding the pixel-aperture region such as the region below the data line 6a and the region in which the disclination of the liquid crystal occurs along the scanning line 3a (i.e., the region in which the capacitor line 3b is formed).

The first interlayer insulating film 81 constituting the second storage capacitor 70b may be composed of a silicon oxide film, a silicon nitride film, or the like, or may be composed of a multilayered film. Various known techniques (low pressure CVD, plasma enhanced CVD, thermal oxidation, etc.) generally used for forming the insulating thin film 2, such as a gate insulating film, may be used for forming the first interlayer insulating film 81. By forming the first interlayer insulating film 81 thinly, the diameter of the contact hole 8a can be further decreased. Thus, the recession and unevenness of the first barrier layer 80a at the contact hole 8a are further reduced, and the pixel electrode 9a lying thereon is further planarized.

In FIG. 3, the TFT 30 for pixel-switching has an LDD (lightly doped drain) structure and includes the scanning line 3a, the channel region 1a' of the semiconductor layer 1 a in which a channel is formed by an electric field from the scanning line 3a, the insulating thin film 2 containing the gate insulating film for insulating the scanning line 3a from the semiconductor layer 1a, the data line 6a, the low-concentration source region 1b and the low-concentration drain region 1c of the semiconductor layer 1a, and the high-concentration source region 1d and the high-concentration drain region 1e of the semiconductor layer 1a. One corresponding pixel electrode 9a among the plurality of pixel electrodes 9a is electrically connected to the high-concentration drain region 1e interconnected by the first barrier layer 80a. The low-concentration source region 1b, the high-concentration source region 1d, the low-concentration drain region 1c, and the high-concentration drain region 1e are formed by doping n-type or p-type impurities having given concentrations to the semiconductor layer 1a, depending on either an n-type channel or a p-type channel to be formed. Since a TFT having an n-type channel responds rapidly, it is often used as the TFT 30 for pixel-switching, which is a switching element for a pixel. In this embodiment, the data line 6a is composed of a light-shielding conductive thin film such as a metal film having low resistance, e.g., Al or an alloy film, e.g., a metal silicide. On the first barrier layer 80a and the first interlayer insulating film 81, a second interlayer insulating film 4 provided with a contact hole 5 leading to the high-concentration source region 1d and a contact hole 8b leading to the first barrier layer 80a is formed. The data line 6a is electrically connected to the high-concentration source region 1d through the. contact hole 5 leading to the high-concentration source region 1d. Furthermore, a third interlayer insulating film 7 provided with the contact hole 8b leading to the first barrier layer 80a is formed on the data line 6a and the second interlayer insulating film 4. The pixel electrode 9a is electrically connected to the first barrier layer 80a through the contact hole 8b, and is further electrically connected to the high-concentration drain region 1e, being interconnected by the first barrier layer 80a through the contact hole 8a The pixel electrode 9a is provided on the upper surface of the third interlayer insulating film 7 constructed as described above.

Although the TFT 30 for pixel-switching preferably has the LDD structure as described above, the TFT 30 may have an offset structure in which impurity ion implantation is not performed to the low-concentration source region 1b and the low-concentration drain region 1c, or the TFT 30 may be of the self-aligned type in which impurity ion implantation is performed to a high concentration with a gate electrode comprising a portion of the scanning line 3a serving as a mask and high-concentration source and drain regions are formed in a self-aligned manner.

Although a single gate structure is employed in this embodiment in which only one gate electrode of the TFT 30 for pixel-switching is disposed between the high-concentration source region 1d and the high-concentration drain region 1e, two or more gate electrodes may be disposed therebetween. In such a case, the same signals are applied to the individual gate electrodes. If the TFT with a dual gate, triple gate, or more is employed, a leakage current at the junction between the channel region and the source region or the drain region can be prevented, and thus, an off-state current can be reduced. If at least one of the gate electrodes has a LDD structure or an offset structure, an off-state current can be further reduced, and a stable switching element is obtainable.

As shown in FIGS. 2 and 3, in the electro-optical device of this embodiment, since the high-concentration drain region 1e and the pixel electrode 9a are electrically connected to each other through the contact hole 8a and the contact hole 8b via the first barrier layer 80a, the diameter of each of the contact hole 8a and the contact hole 8b can be decreased in comparison with a case in which one contact hole is made from the pixel electrode 9a to the drain region. That is, when one contact hole is opened, as the contact hole is deepened, the etching accuracy is decreased, in order to prevent the penetration through the very thin semiconductor layer 1a, for example, with a thickness of approximately 50 nm, the process must be performed such that dry etching, which can decrease the diameter of the contact hole, is stopped, and wet etching is then performed to open the hole to the semiconductor layer 1a. Alternatively, a polysilicon film for preventing the penetration by dry etching must be provided separately.

In contrast, in this embodiment, since the pixel electrode 9a and the high-concentration drain region 1e are connected by two serial contact holes, i.e., the contact hole 8a and the contact hole 8b, each of the contact hole 8a and the contact hole 8b can be opened by dry etching, or at least the distance in which the hole is opened by wet etching can be shortened. However, in order to form the contact hole 8a and the contact hole 8b in a slightly tapered shape, wet etching may be performed for a relatively short period of time after dry etching is performed.

As described above, in this embodiment, the diameter of each of the contact hole 8a and the contact hole 8b can be decreased, and the recession and unevenness on the surface of the first barrier layer 80a at the contact hole 8a can be reduced, and thus the planarization of the pixel electrode 9a lying thereon is promoted to a certain extent. Furthermore, since the recession and unevenness on the surface of the pixel electrode 9a at the second contact hole 8b are also reduced, the planarization of the pixel electrode 9a at this section is promoted to a certain extent.

In this embodiment, in particular, the first barrier layer 80a is composed of a conductive light-shielding film. Therefore, each pixel-aperture region can be at least partially delimited by the first barrier layer 80a For example, the first barrier layer 80a is composed of an elemental metal, an alloy, a metal silicide, or the like containing at least one opaque high-melting point metal selected from the group consisting of Ti, Cr, W, Ta, Mo, and Pb. Thereby, satisfactory electrical connection between the first barrier layer 80a and the pixel electrode 9a can be obtained through the contact hole 8b. The first barrier layer 80a preferably has a thickness, for example, approximately in the range from 50 nm to 500 nm. If the thickness is approximately 50 nm, the possibility of the penetration is reduced when the second contact hole 8b is opened in the fabrication process, and if the thickness is approximately 500 nm, the unevenness of the surface of the pixel electrode 9a due to the presence of the first barrier layer 80a is negligible or can be planarized relatively easily.

Furthermore, in this embodiment, right and left sides of a region along the data lines 6a in the pixel-aperture region in each pixel are delimited by the island-like second barrier layer 80b which extends longitudinally along the data lines 6a and by the data lines 6a in the periphery of the contact hole 5, and upper and lower sides of a region along the scanning lines 3a and the capacitor lines 3b in the pixel-aperture region in each pixel are delimited by the first barrier layer 80a and by the first light-shielding film 11a.

More specifically, as shown in FIGS. 2 and 4, the second barrier layer 80b is partially disposed within a space between the pixel electrodes 9a and partially overlaps the pixel electrodes 9a in a plan view. Therefore, by partially overlapping the pixel electrodes 9a and the second barrier layer 80b, most of the right and left sides of the pixel-aperture region in each pixel can be delimited. In particular, at the section in which the pixel-aperture region is delimited by the second barrier layer 80b, since there is no space between the pixel electrodes 9a and the second barrier layer 80b, light leakage does not occur through such a space. As a result, the contrast ratio can be increased. Simultaneously, at the section in which the pixel-aperture region is delimited by the second barrier layer 80b, since it is not necessary to delimit the pixel-aperture region by the data lines 6a, the width of the data lines 6a is slightly narrower than that of the second barrier layer 80b. Consequently, as shown in FIG. 4, by setting the data line 6a and the pixel electrodes 9a so as not to overlap each other, with the third interlayer insulating film 7 therebetween, parasitic capacitance does not occur between the source and the drain of the TFT 30 in each pixel. Therefore, it is possible to avoid the leakage of a voltage to be retained by the pixel electrode 9a because of the abnormal operation of the TFT 30 due to the parasitic capacitance between the source and the drain resulting from fluctuations in the potential of the data line 6a fluctuated by the potential of image signals supplied to TFTs 30 in other columns during a predetermined period, such as one frame. As a result, flickering and line nonuniformity in the display image can be reduced. However, in the relatively small region in the periphery of the contact hole 5 in which the second barrier layer 80b is not present, the pixel-aperture region may be delimited by the data lines 6a by slightly increasing the width of the data lines 6a.

By delimiting the pixel-aperture region as described above, there is no need to form the second light-shielding film 23 on the counter substrate 20, and thus the cost of the counter substrate can be reduced. Furthermore, a decrease in the pixel-aperture ratio and the fluctuation due to a deviation in the alignment of the counter substrate 20 and the TFT array substrate 10 can be prevented. When the second light-shielding film 23 is provided on the counter substrate 20, even if the second light-shielding film 23 is formed to be rather small so that the pixel-aperture ratio is not decreased due to the deviation in the alignment of the TFT array substrate 10, since the pixel-aperture region is delimited by the light-shielding films formed on the TFT array substrate 10 side, such as the data line 6a, the first barrier layer 80a, the second barrier layer 80b, and the first light-shielding film 11a, as described above, the pixel-aperture region can be accurately delimited, and the pixel-aperture ratio can be improved in comparison with the case in which the pixel-aperture region is determined by the second light-shielding film 23 on the counter substrate 20.

Furthermore, due to the structure in which the width of the data line 6a is slightly narrowed so that the data line 6a and the edge of the pixel electrode 9a do not overlap each other as shown in FIGS. 2 and 4, electrical short-circuiting and the like between the two, that are highly likely to occur at the section in which the data line 6a and the pixel electrode 9a overlap, with the third interlayer insulating film 7 therebetween, can be prevented from occurring, and thereby the defect rate of the device can be decreased and the yield during the fabrication can be improved.

The second barrier layer 80b is preferably electrically connected to the capacitor line 3b or other constant-potential lines. That is, because of the overlap of the edge of the second barrier layer 80b and the edge of the pixel electrode 9a, slight parasitic capacitance occurs therebetween. However, if the potential of the second barrier layer 80b remains constant, an adverse influence brought to the potential of the pixel electrode 9a by a change in the potential of the second barrier layer 80b can be reduced. Additionally, the contact hole 8c for electrically connecting the second barrier layer 80b and the capacitor line 3b can be opened in the same step as that of opening the contact hole 8a, and thus the fabrication process does not increase in complexity. Additionally, in such a case, the second barrier layer 90b is electrically connected to the capacitor line 3b through the contact hole 8c for each pixel.

In the structure in which the second barrier layer 80b and the data line 6a are disposed opposite to each other with the second interlayer insulating film 4 therebetween, capacitance is added to the data line 6a between the data line 6a and the second barrier layer 80b in which the potential is much stabilized. Therefore, the capacitance of the data line 6a can be set appropriately so as to prevent fluctuations in the potential. In particular, even if the pixel pitch is greatly reduced and accordingly the width of the data line 6a is greatly reduced, by increasing the capacitance between the data line 6a and the second barrier layer 80b, insufficient capacitance of the data line 6a can be prevented. Thereby, insufficient writing capacitance in supplying image signals to the pixel electrode 9a through the data line 6a can be avoided. That is, the structure in which the data line 6a is not influenced by noise, that is advantageous when the pixel pitch is greatly reduced, can be obtained relatively easily.

Additionally, although the planar shape of each of the contact holes (8a, 8b, 8c, and 5) in this embodiment may be circular, square, polygonal, or the like, a circular shape is particularly useful in preventing cracks from occurring in the interlayer insulating film, etc., in the periphery of the contact hole. In order to obtain satisfactory electrical connection, the contact holes are preferably slightly tapered by wet etching after dry etching is performed.

As described above, in accordance with the electro-optical device of the first embodiment, since the first barrier layer 80a has a function of interconnecting the TFT 30 and the pixel electrode 9a and also the second barrier layer 80b composed of the same film as that of the first barrier layer 80a has a function of delimiting the pixel-aperture region while maintaining the stable supply of image signals, the layered structure and the fabrication process can be simplified and cost reduction can be achieved.

Fabrication Process of Electro-optical Device in First Embodiment

Next, the fabrication process for the TFT array substrate constituting the electro-optical device having the structure described above in this embodiment will be described with reference to FIGS. 5 to 8. Additionally, FIGS. 5 to 8 are flowcharts in which the individual layers on the TFT array substrate side are shown in sectional views taken along the line III—III of FIG. 2 in a manner similar to that of FIG. 3.

Figure 5:
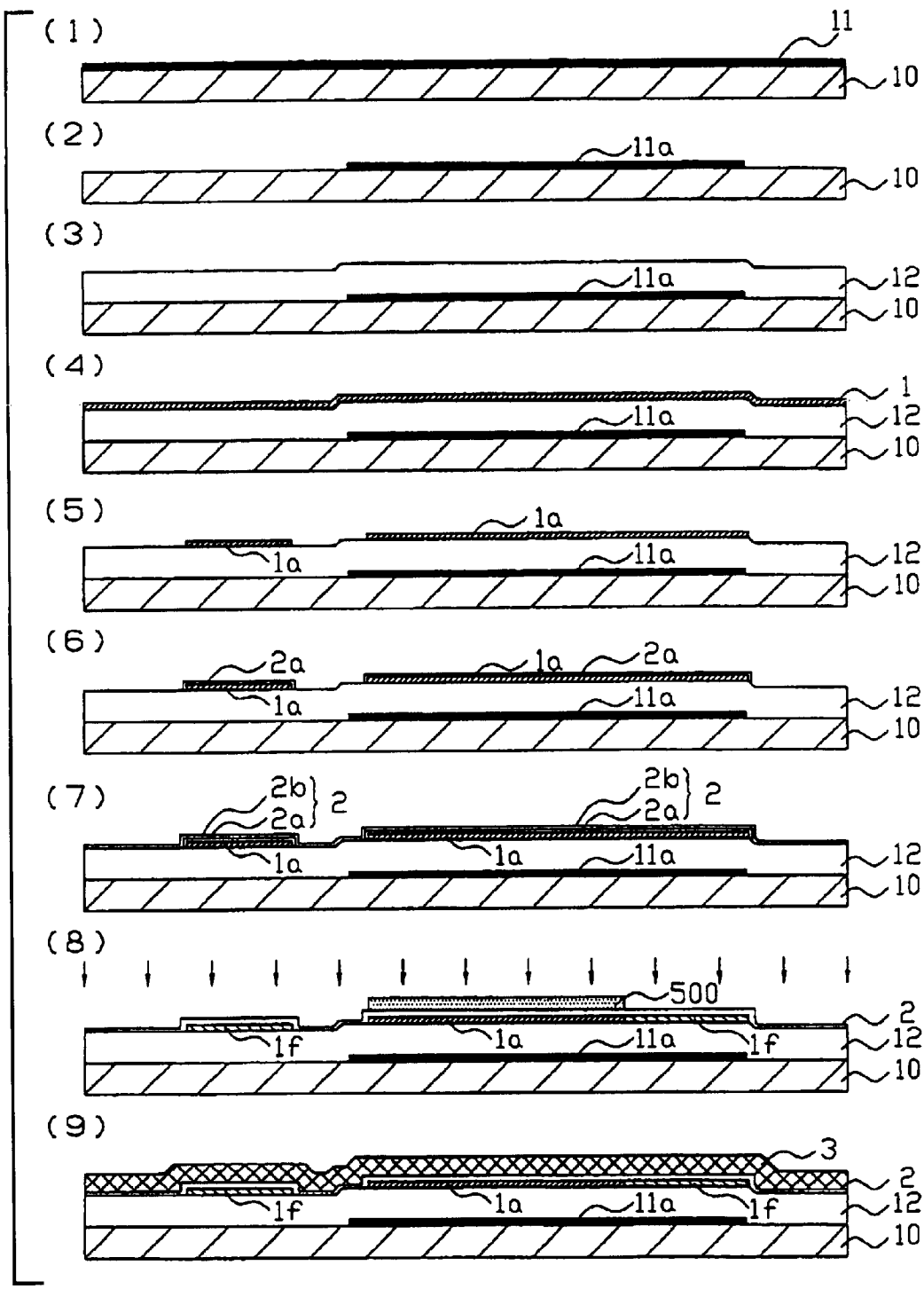
FIG. 5 is a flowchart showing a first part of the fabrication process for the electro-optical device of the first embodiment.

As shown in step (1) of FIG. 5, the TFT array substrate 10 composed of a quartz substrate, a hard glass substrate, a silicon substrate, or the like is prepared. At this stage, preferably, pre-treatment is performed so that deformation occurring in the TFT array substrate 10 in the subsequent high-temperature process is reduced, in which heat treatment is performed in an inert gas atmosphere using N$_2$ (nitrogen) or the like at a high temperature in the range from approximately 900 to 1,300° C. That is, the TFT array substrate 10 is subjected to heat treatment at a temperature that is the same as or greater than the maximum temperature at which high-temperature treatment is performed in the fabrication process. A light-shielding film 11 is then formed on the entire surface of the TFT array substrate 10 which has been subjected to the treatment as described above by sputtering or the like, using a metal such as Ti, Cr, W, Ta, Mo, or Pb or a metal alloy film such as a metal silicide containing the above metal, at a thickness of approximately 100 to 500 nm, and preferably, at a thickness of approximately 200 nm. Additionally, an antireflecting layer composed of a polysilicon film or the like may be formed on the light-shielding film 11 in order to relieve surface reflection.

Next, as shown in step (2), a resist mask corresponding to the pattern of the first light-shielding film 11a is formed on the light-shielding film 11 by photolithography, and the first light-shielding film 11a is formed by etching the light-shielding film 11 through the resist mask.

Next, as shown in step (3), the underlying insulating film 12 composed of a silicate glass film, e.g., NSG (nondoped-silicate glass), PSG (phosphosilicate glass), BSG (borosilicate glass), and BPSG (borophosphosilicate glass), a silicon nitride film, a silicon oxide film, or the like, is formed on the first light-shielding film 11a, using TEOS (tetraethyl orthosilicate) gas, TEB (tetraethyl borate) gas, TMOP (tetramethyloxy phosphate) gas, etc., for example, by atmospheric pressure or low pressure CVD or the like. The underlying insulating film 12 has a thickness of approximately 500 to 2,000 nm.

Next, as shown in step (4), an amorphous silicon film is formed on the underlying insulating film 12 by low temperature CVD (for example, CVD at a pressure of approximately 20 to 40 Pa) using mono-silane gas, disilane gas, or the like at a flow rate of approximately 400 to 600 cc/min in an environment of a relatively low temperature of approximately 450 to 550° C., preferably, of approximately 500° C. Subsequently, by heat treatment in a nitrogen atmosphere at approximately 600 to 700° C. for approximately 1 to 10 hours, preferably, for 4 to 6 hours, a polysilicon film 1 is formed by solid phase epitaxy at a thickness of approximately 50 to 200 nm, preferably at approximately 100 nm. For the solid phase epitaxy, heat treatment using RTA (rapid thermal annealing) may be employed, or laser heat treatment using an excimer laser or the like may be employed.

When a TFT 30 for pixel-switching having an n-type channel is formed as the TFT 30 for pixel-switching shown in FIG. 3, impurities of group V elements, such as Sb (antimony), As (arsenic), and P (phosphorus), may be slightly doped into the channel region by ion implantation or the like. When a TFT 30 for pixel-switching having a p-type channel is formed, impurities of group III elements, such as B (boron), Ga (gallium), and In (indium), may be slightly doped by ion implantation or the like. Additionally, the polysilicon film 1 may be directly formed by low pressure CVD or the like without the step of forming the amorphous silicon film. Alternatively, the polysilicon film 1 may be formed by transforming a polysilicon film deposited by low pressure CVD or the like into an amorphous state by silicon ion implantation, followed by recrystallization by heat treatment or the like.

Next, as shown in step (5), the semiconductor layer 1a having a predetermined pattern including the first storage capacitor electrode 1f is formed by photolithography, etching, etc.

Next, as shown in step (6), the semiconductor layer 1a constituting the TFT 30 for pixel-switching is subjected to thermal oxidation at a temperature of approximately 900 to 1,300° C., preferably, at approximately 1,000° C., to form a relatively thin thermally oxidized silicon film 2a at a thickness of approximately 30 nm. Furthermore, as shown in step (7), an insulating film 2b composed of a high-temperature oxidation silicon film (HTO film) or a silicon nitride film is deposited relatively thinly by low pressure CVD or the like at a thickness of approximately 50 nm, and then an insulating thin film 2 including a gate insulating film of the TFT 30 for pixel-switching, having a multilayered structure including the thermally oxidized silicon film 2a and the insulating thin film 2b, and a first dielectric film for forming storage capacitance is formed. As a result, the semiconductor layer 1a has a thickness of approximately 30 to 150 nm, preferably, approximately 35 to 50 nm. The insulating thin film 2 has a thickness of approximately 20 to 150 nm, preferably, approximately 30 to 100 nm. By shortening the period of time for high-temperature thermal oxidation as described above, in particular, when a large substrate of a size of approximately 8 inches used, warpage due to heat can be avoided. However, an insulating thin film 2 having a single-layer structure may be formed by subjecting the polysilicon film 1 to thermal oxidation only.

Next, as shown in step (8), a resist layer 500 is formed on the semiconductor layer 1a in the region excluding a section for producing the first storage capacitor electrode 1f by photolithography, etching, etc., and then the resistance of the first storage capacitor electrode If is decreased, for example, by doping P ions at a rate of approximately $3 \times 10^{12}/\text{cm}^2$.

Next, as shown in step (9), after the resist layer 500 is removed, a polysilicon film 3 is deposited by low pressure CVD or the like, and then P is thermally diffused to make the polysilicon film 3 conductive. Alternatively, a low-resistance polysilicon film in which P ions are doped simultaneously with the formation of the polysilicon film 3 may be used. The polysilicon film 3 has a thickness of approximately 100 to 500 nm, preferably, approximately 300 nm.

Figure 6:
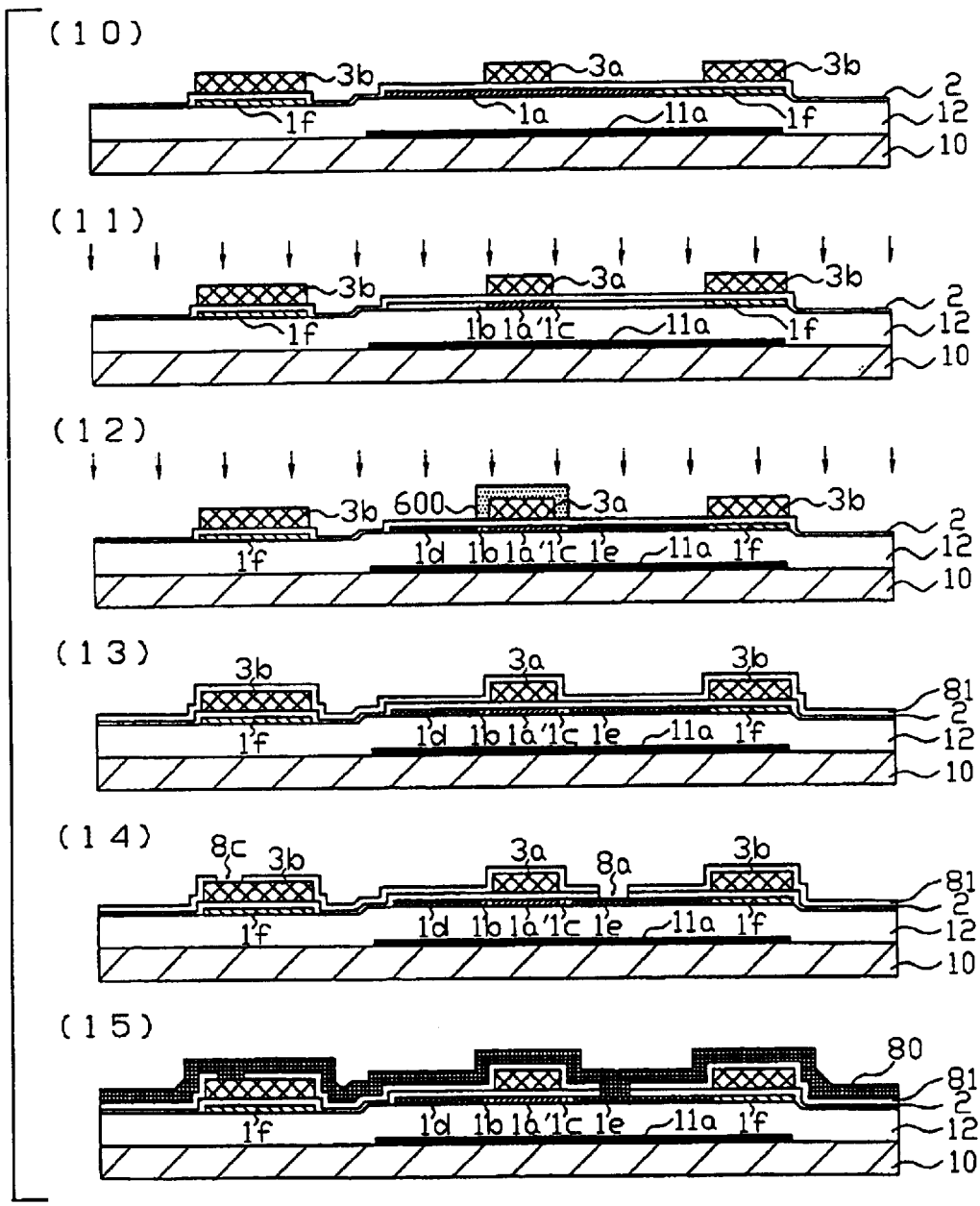
FIG. 6 is a flowchart showing a second part of the fabrication process for the electro-optical device of the first embodiment.

Next, as shown in step (10) of FIG. 6, the scanning line 3a having a predetermined pattern and the capacitor line 3b are formed by photolithography, etching, etc., using a resist mask. The scanning line 3a and the capacitor line 3b may be composed of a high-melting point metal or a metal alloy film such as a metal silicide, or may be formed as multilayered wiring in combination with a polysilicon film, etc.

Next, as shown in step (11), when a TFT having a LDD structure with an n-type channel is formed as the TFT 30 for pixel-switching shown in FIG. 3, in order to first form the low-concentration source region 1b and the low-concentration drain region 1c in the semiconductor layer 1a, impurities of group V elements such as P are doped at a low concentration with a gate electrode comprising a portion of the scanning line 3a serving as a mask. For example, P ions are doped at a rate of 1 to $3 \times 10^{13}/\text{cm}^2$. Thereby, the semiconductor layer 1a beneath the scanning line 3a becomes the channel region 1a'. The resistance of the capacitor line 3b and the scanning line 3a is also decreased by the doping of impurities.

Next, as shown in step (12), in order to form the high-concentration source region 1d and the high-concentration drain region 1e constituting the TFT 30 for pixel-switching, a resist layer 600 is formed on the scanning line 3a using a mask that is broader than the scanning line 3a, and then impurities of group V elements such as P are doped at a high concentration. For example, P ions are doped at a rate of 1 to $3\times10^{15}/cm^2$. When a TFT 30 for pixel-switching having a p-type channel is formed, in order to form the low-concentration source region 1b, the low-concentration drain region 1c, the high-concentration source region 1d, and the high-concentration drain region 1e in the semiconductor layer 1a, doping is performed using impurities of group III elements such as B. Additionally, for example, a TFT having an offset structure may be formed without performing low-concentration doping, or a TFT of the self-aligned type may be formed by an ion implantation technique using P ions, B ions, etc., with the scanning line 3a serving as a mask. By the doping of impurities, the resistance of the capacitor line 3b and the scanning line 3a are further decreased.

Additionally, simultaneously with the formation of the elements in the TFT 30, a peripheral circuit, such as a data line drive circuit and a scanning line drive circuit, having a complementary structure composed of a TFT having an n-type channel and a TFT having a p-type channel may be formed in the periphery of the TFT array substrate 10. As described above, if the semiconductor layer 1a constituting the TFT 30 for pixel-switching is composed of a polysilicon film in this embodiment, the peripheral circuit can be formed in substantially the same step as that of forming the TFT 30 for pixel-switching, which is advantageous to the fabrication.

Next, as shown in step (13), after the resist layer 600 is removed, the first interlayer insulating film 81 composed of a high-temperature oxidation silicon film (HTO film) or a silicon nitride film is deposited on the capacitor line 3b, the scanning line 3a, and the insulating thin film 2 relatively thinly at a thickness of approximately 200 nm or less by low pressure CVD, plasma enhanced CVD, or the like. However, as described above, the first interlayer insulating film 81 may be composed of a multilayered film, and the first interlayer insulating film 81 may be formed by any known technique used for forming a gate insulating film of a TFT in general.

Next, as shown in step (14), a contact hole 8a for electrically connecting the first barrier layer 80a and the high-concentration drain region 1e and a contact hole 8c for electrically connecting the second barrier layer 80b and the capacitor line 3b are formed by dry etching such as reactive ion etching or reactive ion beam etching. Since such etching has high directivity, it is possible to open each of the contact hole 8a and the contact hole 8c with a small diameter. Alternatively, wet etching that is suitable for preventing the contact hole 8a from penetrating the semiconductor layer 1a may be combined. The wet etching is also advantageous in view of tapering the contact hole 8a for more satisfactory electrical connection. In particular, the contact hole 8a and the contact hole 8c can be opened simultaneously, which is advantageous in the fabrication.

Next, as shown in step (15), a conductive film 80 is formed on the entire surface of the first interlayer insulating film 81, the high-concentration drain region 1e exposed through the contact hole 8a, and the capacitor line 3b exposed through the contact hole 8c by depositing a metal such as Ti, Cr, W, Ta, Mo, or Pb or a metal alloy film such as a metal silicide at a thickness of approximately 50 to 500 nm. If the thickness is approximately 50 nm, the possibility of the penetration is greatly reduced when the contact hole 8b is opened in the later step. Additionally, an antireflecting layer composed of a polysilicon film or the like may be formed on the conductive film 80 in order to relieve surface reflection. The conductive film 80 may be a multilayered film composed of a metal, a metal alloy film such as a metal silicide, or a polysilicon film.

Figure 7:
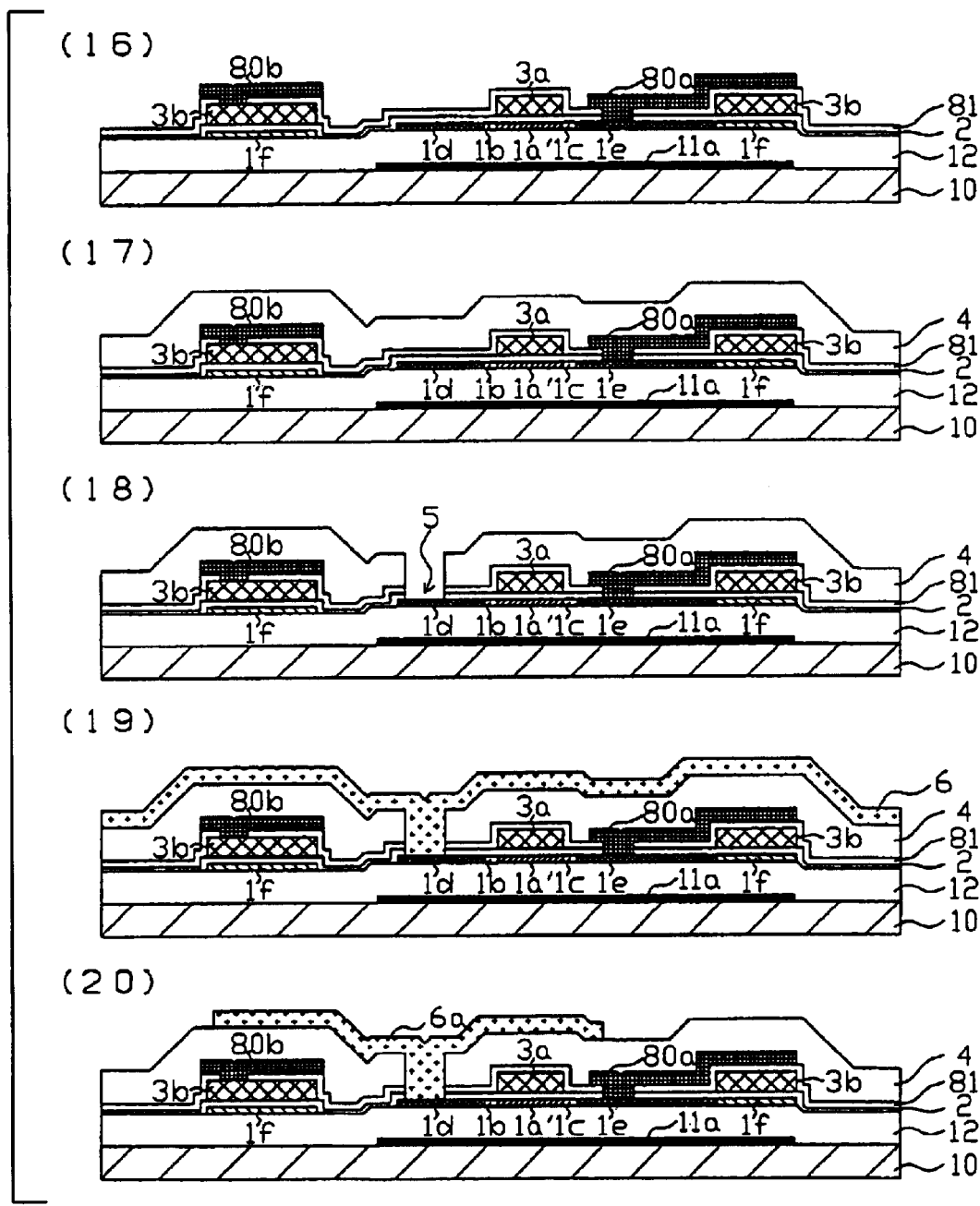
FIG. 7 is a flowchart showing a third part of the fabrication process for the electro-optical device of the first embodiment.

Next, as shown in step (16) of FIG. 7, the first barrier layer 80a and the second barrier layer 80b are formed by subjecting the conductive film 80 to photolithography, etching, etc. The second barrier layer 80b is preferably formed so that a portion thereof slightly overlaps the pixel electrode 9a to be formed later as shown in FIG. 4.

Next, as shown in step (17), the second interlayer insulating film 4 composed of a silicate glass such as NSG, PSG, BSG, or BPSG, a silicon nitride film, a silicon oxide film, or the like is formed by atmospheric pressure CVD or low pressure CVD, using TEOS gas, etc., so as to cover the first interlayer insulating film 81, the first barrier layer 80a, and the second barrier layer 80b. The second interlayer insulating film 4 preferably has a thickness of approximately 500 to 1,500 nm. If the second interlayer insulating film 4 has a thickness of 500 nm or more, parasitic capacitance between the data line 6a and the scanning line 3a will not present a great problem or will present almost no problem.

Next, in step (18), after heat treatment is performed at approximately 1,000° C. for approximately 20 minutes in order to activate the semiconductor layer 1a, the contact hole 5 for electrically connecting the data line 6a and the high-concentration drain region 1e of the semiconductor layer 1a to each other is opened through the insulating thin film 2, the first interlayer insulating film 81, and the second interlayer insulating film 4. Additionally, a contact hole for connecting the scanning line 3a or the capacitor line 3b to a wiring, not shown in the drawing, in the periphery of the substrate may be opened in the same step as that for the contact hole 5.

Next, as shown in step (19), a metal film 6 composed of a light-shielding low-resistance metal, such as Al, or metal silicide, is deposited on the second interlayer insulating film 4 by sputtering or the like at a thickness of approximately 100 to 500 nm, preferably, at a thickness of approximately 300 nm.

Next, as shown in step (20), the data line 6a is formed by photolithography, etching, etc. The data line 6a is formed so as not to overlap the pixel electrode 9a to be formed later and so as to overlap the second barrier layer 80b as shown in FIG. 4.

Figure 8:
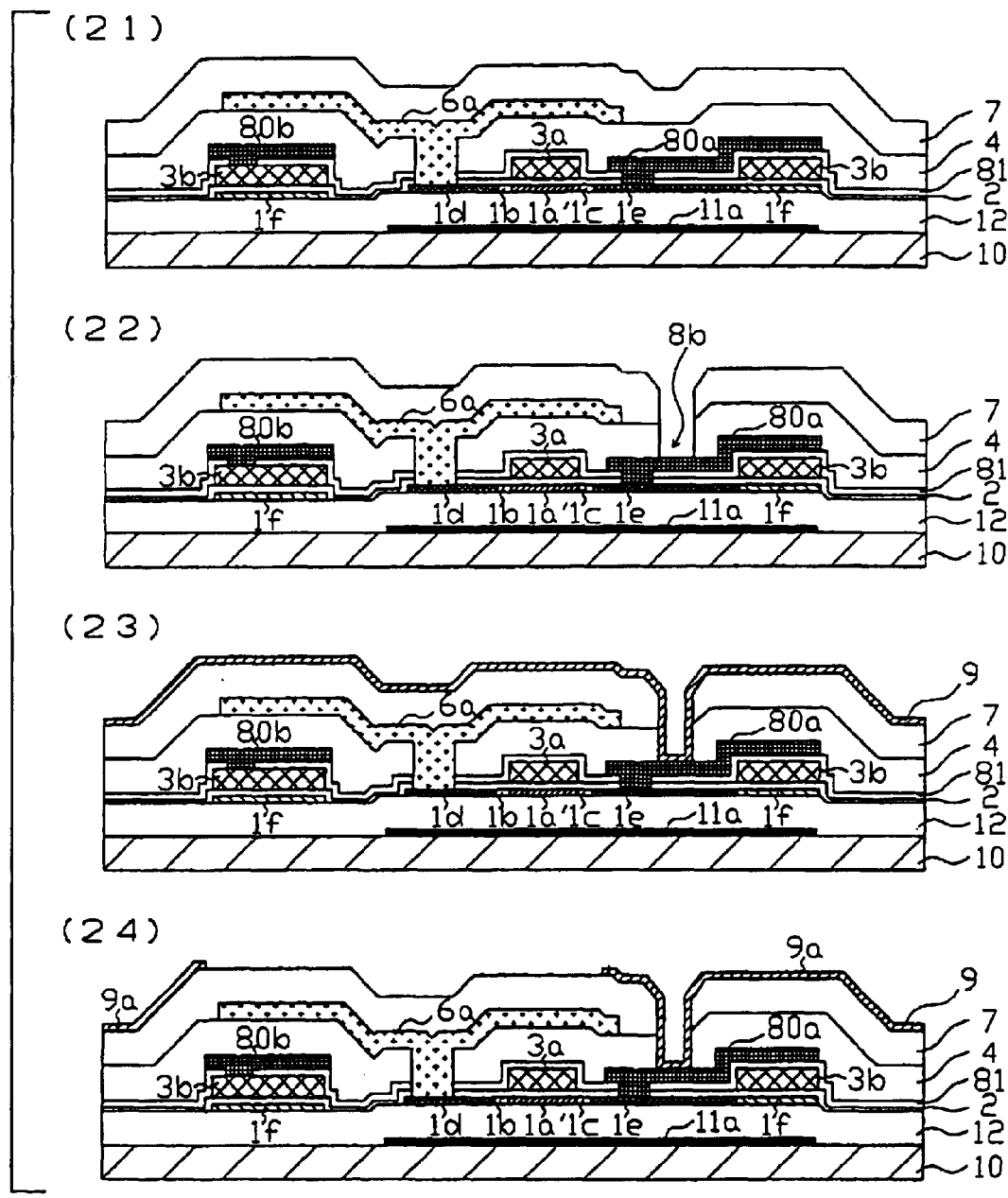
FIG. 8 is a flowchart showing a fourth part of the fabrication process for the electro-optical device of the first embodiment.

Next, as shown in step (21) of FIG. 8, the third interlayer insulating film 7 composed of a silicate glass film, such as NSG, PSG, BSG, or BPSG, a silicon nitride film, a silicon oxide film, or the like is formed so as to cover the data line 6a, for example, by atmospheric pressure CVD or low pressure CVD, using TEOS gas or the like. The third interlayer insulating film 7 preferably has a thickness of approximately 500 to 1,500 nm.

Next, as shown in step (22), the contact hole 8b for electrically connecting the pixel electrode 9a and the first barrier layer 80a to each other is formed by dry etching, such as reactive ion etching or reactive ion beam etching. In order to form a tapered shape, wet etching may be included therein.

Next, as shown in step (23), a transparent conductive thin film 9 composed of an ITO film or the like is deposited on the third interlayer insulating film 7 by sputtering or the like at a thickness of approximately 50 to 200 nm. Furthermore, as shown in step (24), the pixel electrode 9a is formed by photolithography, etching, etc. Additionally, when the electro-optical device is used as a reflection type, the pixel electrode 9a may be formed of an opaque material having a high reflectance, such as Al.

As described above, in accordance with the fabrication process in this embodiment, the electro-optical device in accordance with the first embodiment can be fabricated with relatively small numbers of steps, and with the relatively simplified individual steps.

Second Embodiment

Figure 9:
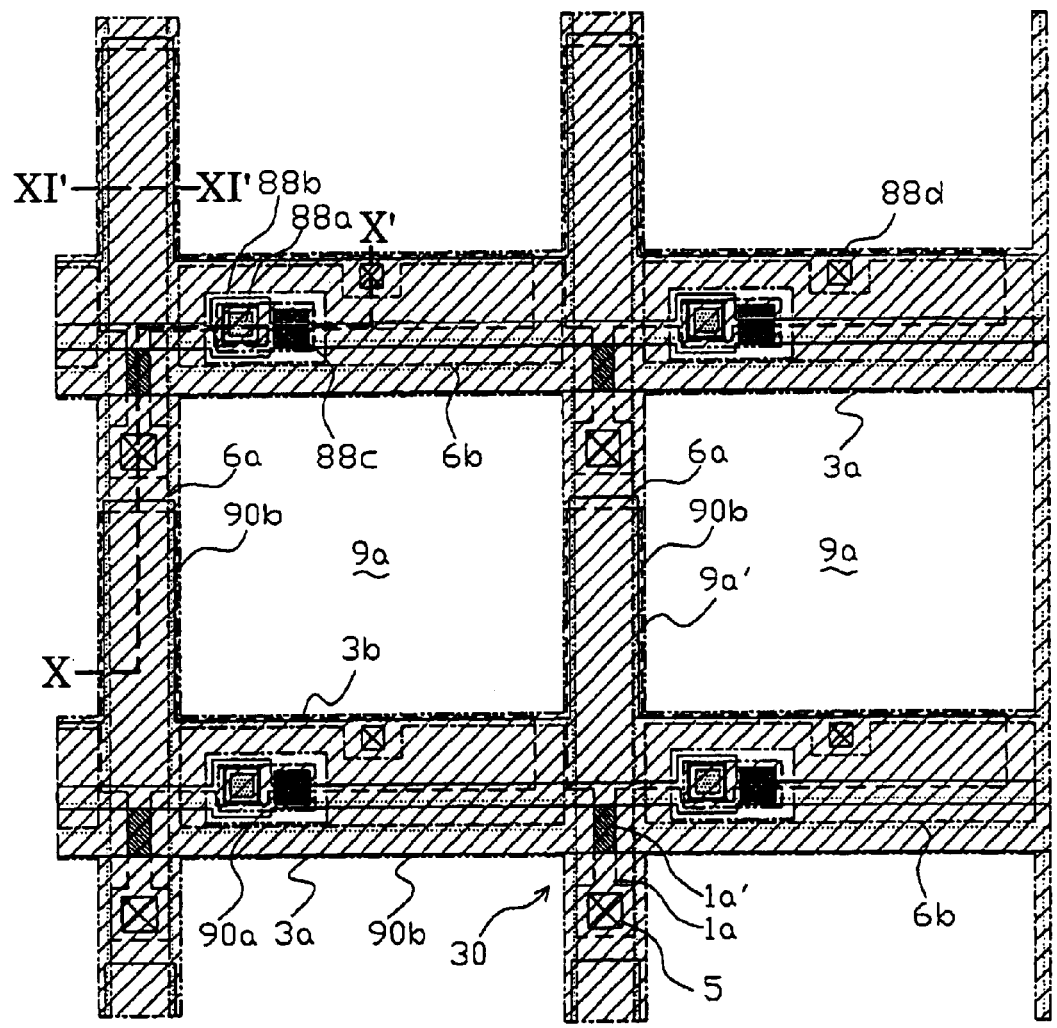
FIG. 9 is a plan view of a plurality of adjacent pixels in a TFT array substrate provided with data lines, scanning lines, pixel electrodes, etc. in an electro-optical device of a second embodiment.
Figure 10:
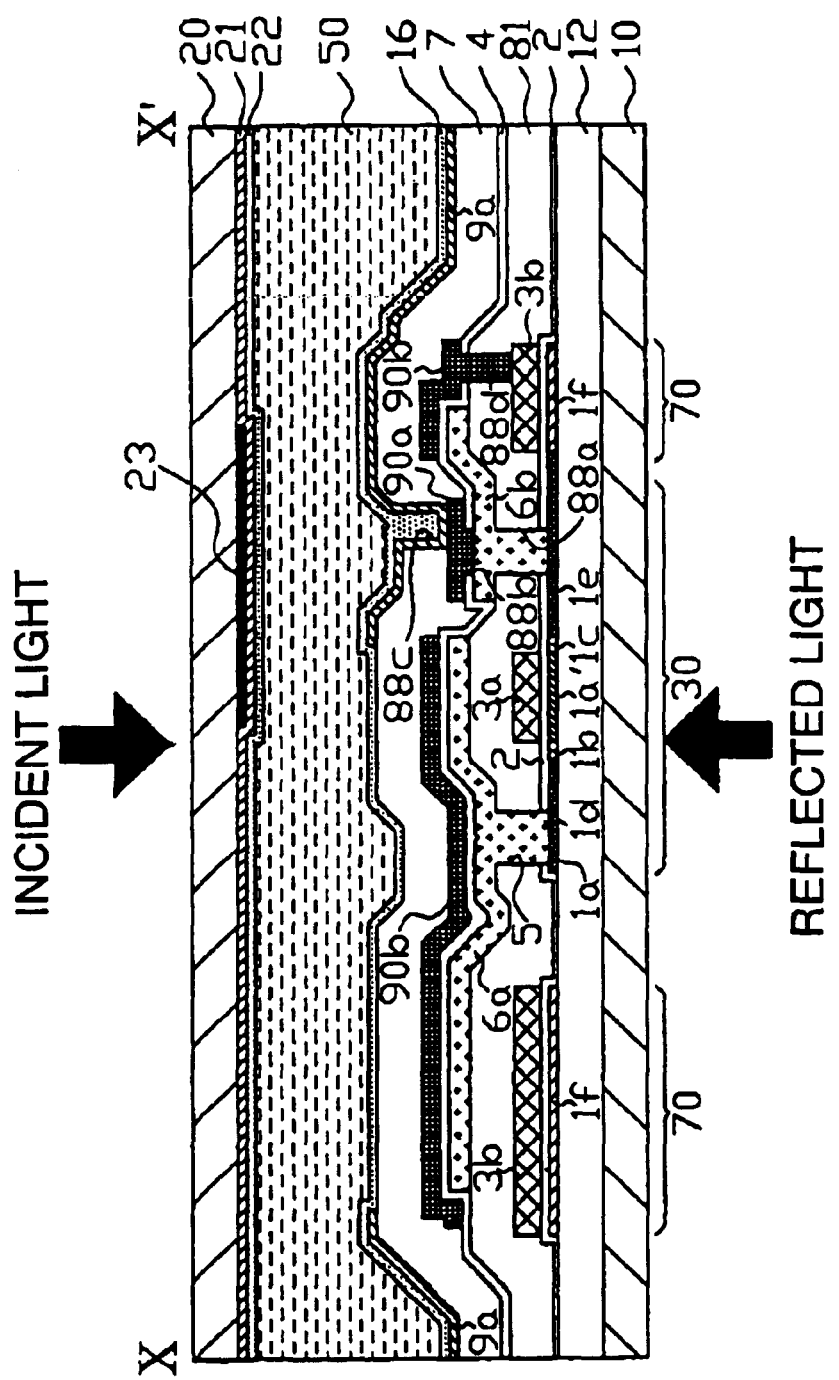
FIG. 10 is a sectional view taken along the line X–X' of FIG. 9.
Figure 11:
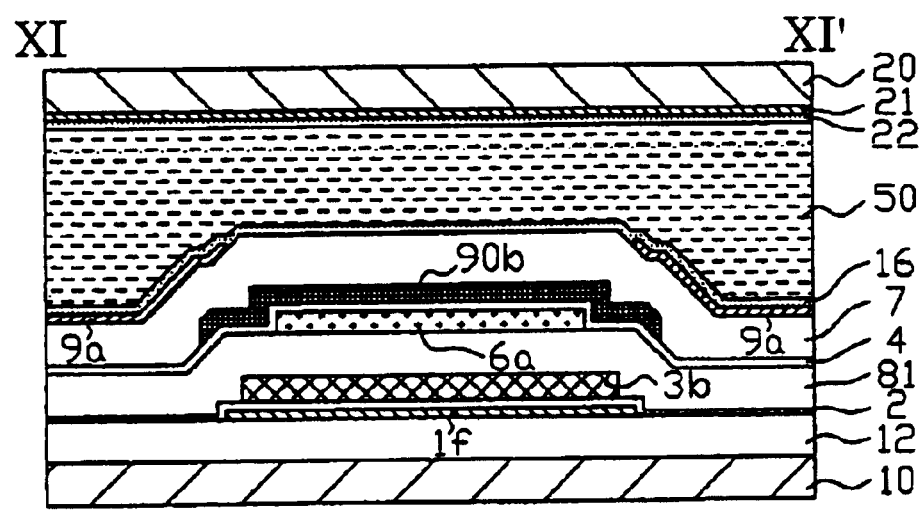
FIG. 11 is a sectional view taken along the line XI–XI' of FIG. 9.

The structure of an electro-optical device in a second embodiment of the present invention will be described with reference to FIGS. 9 to 11. FIG. 9 is a plan view of a plurality of adjacent pixels in a TFT array substrate provided with data lines, scanning lines, pixel electrodes, etc. in the second embodiment. FIG. 10 is a sectional view taken along the line X–X' of FIG. 9, and FIG. 11 is a sectional view taken along the line XI–XI' of FIG. 9. Additionally, in FIGS. 10 and 11, in order to make the individual layers and the individual elements recognizable in the drawings, different scales are used for the individual layers and the individual elements. Additionally, in the second embodiment shown in FIGS. 9 to 11, the same reference numerals are used for the similar elements to those in the first embodiment shown in FIGS. 2 and 4, and description thereof will be omitted.

The electro-optical device of the second embodiment shown in FIGS. 9 to 11 is provided with an interconnecting conductive layer 6b which is electrically connected to a high-concentration drain region 1e of a semiconductor layer 1a through a contact hole 88a, and which is composed of the same film as that of a data line 6a, and a first barrier layer 90a composed of a light-shielding conductive layer electrically connected to a pixel electrode 9a through a contact hole 88c. The interconnecting conductive layer 6b and the first barrier layer 90a are disposed opposite to each other with a second interlayer insulating film 4 formed on the data line 6a and the interconnecting conductive layer 6b therebetween, and are electrically connected to each other through a contact hole 88b opened in the second interlayer insulating film 4. On the other hand, in the second embodiment, a second barrier layer 90b composed of the same light-shielding conductive layer as that of the first barrier layer 90a is provided, and the second barrier layer 90b and a capacitor line 3b are electrically connected to each other through a contact hole 88d. Thereby, the second barrier layer 90b can be used as a storage capacitor electrode and as a capacitor line by being connected to the adjacent pixels. In such a case, the capacitor line 3b, as a storage capacitor electrode, may be shaped like an island for each pixel. Thereby, the pixel-aperture ratio can be increased. By electrically connecting the second barrier layer 90b and the capacitor line 3b to each other, the capacitor line can be formed in duplicate, enabling a redundant structure. As shown in FIG. 9, the second barrier layer 90b is provided like a grid covering the spaces between the pixel electrodes 9a excluding the region in which the first barrier layer 90a is present in a plan view, so that right and left sides and upper and lower sides along the data lines 6a and the scanning line 3a in the pixel-aperture region are delimited. In such a case, in a manner similar to that in the first embodiment, the edge of the second barrier layer 90b slightly overlaps the edge of the pixel electrode 9a. Additionally, by covering the spaces between the first barrier layer 90a and the second barrier layer 90b with the interconnecting conductive layer 6b and a second light-shielding film 23 on the side of the counter substrate, light leakage can be easily prevented. The other constructions are the same as those in the first embodiment.

As described above, in the second embodiment, the pixel electrode 9a and the semiconductor layer 1a can be satisfactorily interconnected by the two interconnecting conductive layers, i.e., the interconnecting conductive layer 6b and the first barrier layer 90a. In particular, when the pixel electrode 9a is composed of an ITO film and the data line 6a is composed of an Al film, preferably, a high-melting point metal, such as Ti, Cr, or W, having satisfactory electrical connection with both films is employed.

As shown in FIG. 11, in the structure in which the data line 6a is sandwiched between the capacitor line 3b and the barrier layer 90b with the first interlayer insulating film 81 and the second interlayer insulating film 4, as dielectric films, therebetween, capacitance is added to the data line 6a between the data line 6a and the capacitor line 3b as well as the second barrier layer 90b in which the potential is much stabilized. Therefore, the capacitance of the data line 6a can be appropriately set so as to prevent fluctuations in the potential, and insufficient writing capacitance in supplying image signals to the pixel electrode 9a through the data line 6a can be avoided.

In order to form such an interconnecting conductive layer 6b composed of the same film as that of the Al film, for example, in the step (18) of the fabrication process in the first embodiment, the contact hole 88a leading to the high-concentration drain region 1e is opened, and when the interconnecting conductive layer 6b is formed above the high-concentration drain region 1e including the contact hole 88a in the step (20), the Al film formed in the step (19) may be subjected to photolithography, etching, etc. Furthermore, the second interlayer insulating film 4, the first barrier layer 90a, and the second barrier layer 90b may be formed on the data line 6a and the interconnecting conductive layer 6b in a process similar to that from the step (13) to the step (16) in the first embodiment.

Third Embodiment

Figure 12:
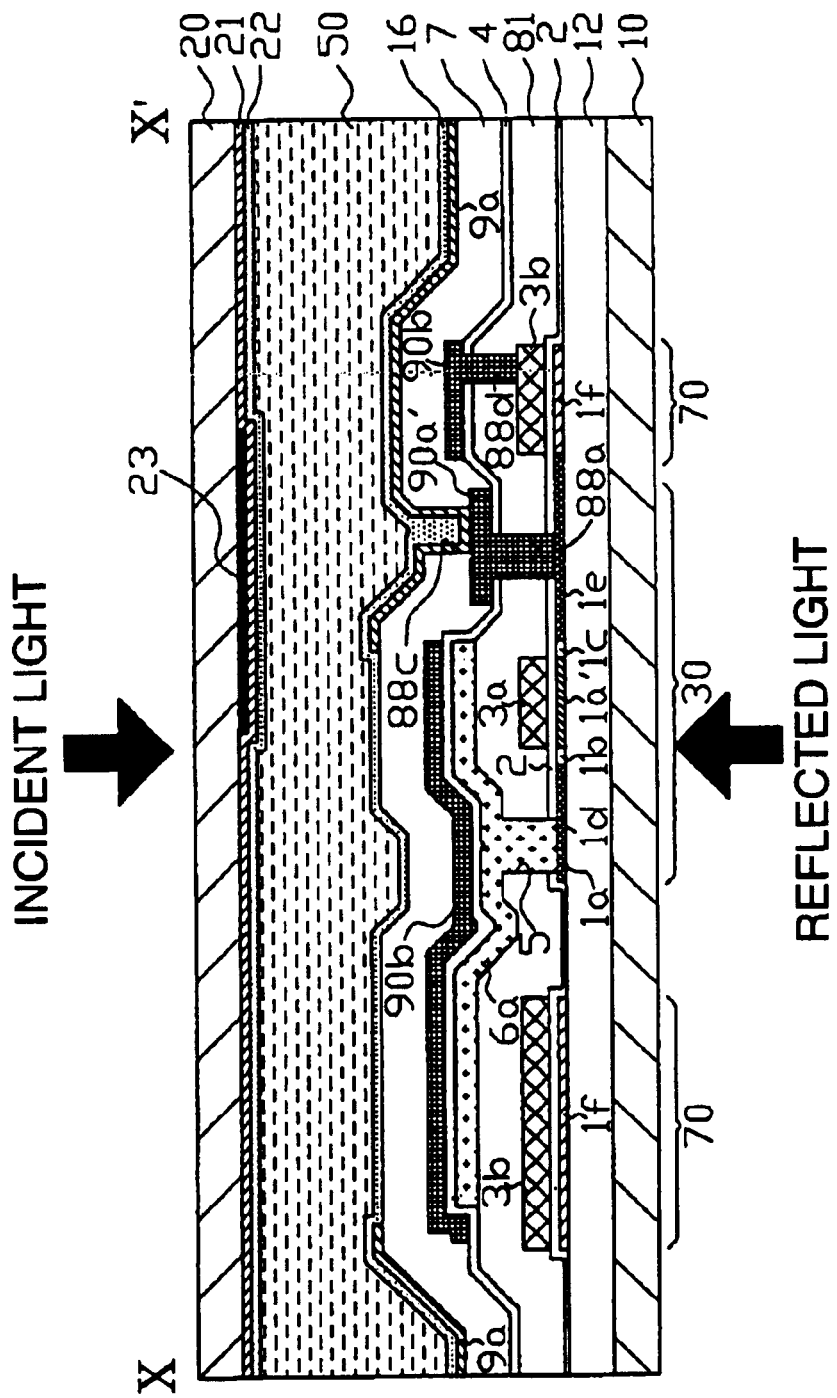
FIG. 12 is a sectional view of an electro-optical device in a third embodiment.

The structure of an electro-optical device in a third embodiment will be described with reference to FIG. 12. FIG. 12 is a sectional view corresponding to the sectional view provided with data lines, scanning lines, pixel electrodes, etc., in the third embodiment. In FIG. 12, in order to make the individual layers and the individual elements recognizable in the drawing, different scales are used for the individual layers and the individual elements. Additionally, in the third embodiment shown in FIG. 12, the same reference numerals are used for the elements similar to those in the second embodiment shown in FIG. 10, and description thereof will be omitted.

As shown in FIG. 12, the third embodiment differs from the second embodiment in that, without using the interconnecting conductive layer 6b, a first barrier layer 90a' is constructed so as to be electrically connected to a high-concentration drain region 1e directly. The other constructions are the same as those in the second embodiment.

Accordingly, in the third embodiment, the pixel electrode 9a and the high-concentration drain region 1e can be electrically interconnected by the first barrier layer 90a' composed of a high-melting point metal film, which is electrically compatible with an ITO film constituting the pixel electrode 9a.

Fourth Embodiment

Figure 13:
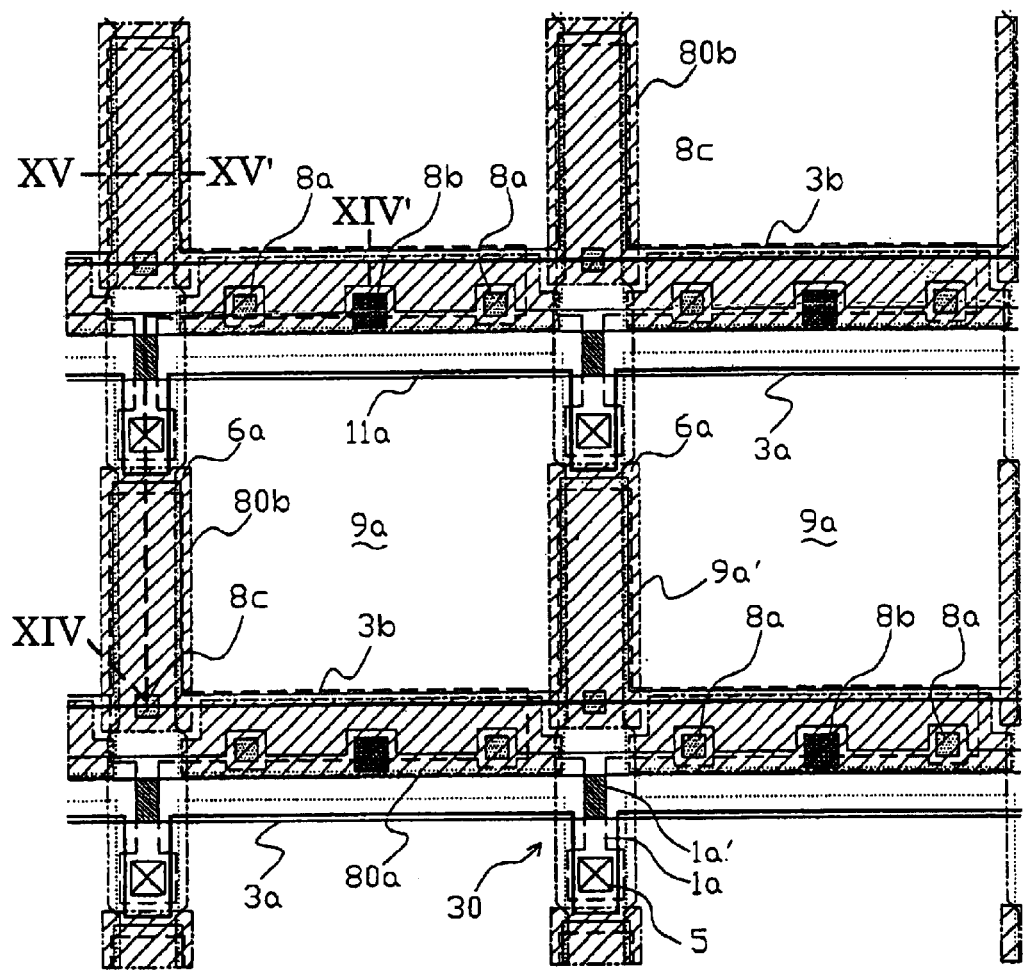
FIG. 13 is a plan view of a plurality of adjacent pixels in a TFT array substrate provided with data lines, scanning lines, pixel electrodes, etc. in an electro-optical device of a fourth embodiment.
Figure 14:
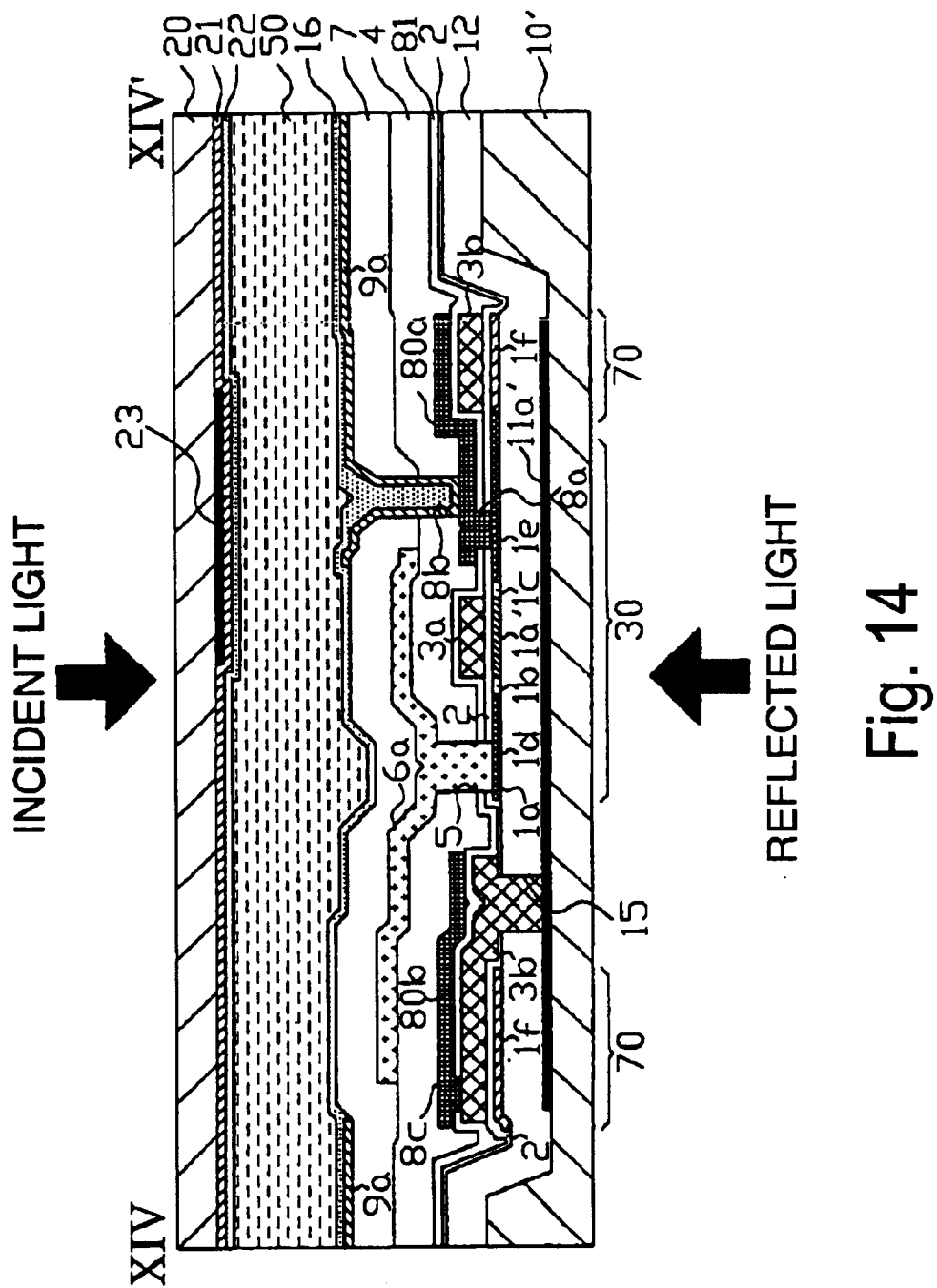
FIG. 14 is a sectional view taken along the line XIV–XIV' of FIG. 13.
Figure 15:
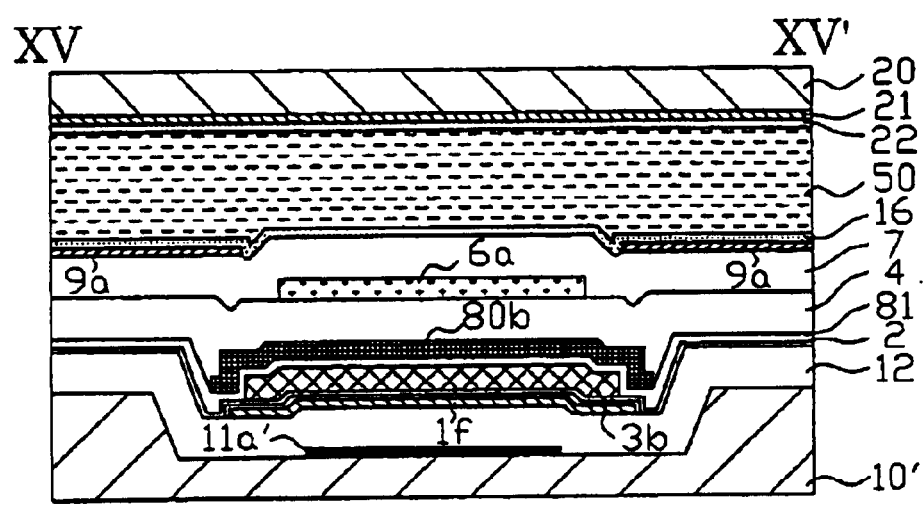
FIG. 15 is a sectional view taken along the line XV–XV' of FIG. 13.

The structure of an electro-optical device in a fourth embodiment of the present invention will be described with reference to FIGS. 13 to 15. FIG. 13 is a plan view of a plurality of adjacent pixels in a TFT array substrate provided with data lines, scanning lines, pixel electrodes, etc. in the fourth embodiment. FIG. 14 is a sectional view taken along the line XIV–XIV' of FIG. 13, and FIG. 15 is a sectional view taken along the line XV–XV' of FIG. 13. In FIGS. 14 and 15, in order to make the individual layers and the individual elements recognizable in the drawings, different scales are used for the individual layers and the individual elements. Additionally, in the fourth embodiment shown in FIGS. 13 to 15, the same reference numerals are used for the elements similar to those in the first embodiment shown in FIGS. 2 to 4, and description thereof will be omitted.

As shown in FIGS. 13 to 15, the fourth embodiment differs from the first embodiment in that a first light-shielding film 11a' is formed like a grid along the spaces between the adjacent pixel electrodes 9a, and a capacitor line 3b is electrically connected to the first light-shielding film 11a' through a contact hole 15 for each pixel. The first light-shielding film 11a' can be used as a redundant wiring of the capacitor line 3b, and by decreasing the resistance of the capacitor line 3b, the potential of a storage capacitor 70 can be stabilized. In this structure, by using the first light-shielding film 11a' as a capacitor line, the capacitor line 3b may be formed as a storage capacitor electrode shaped like an island for each pixel. Thereby, the pixel-aperture ratio can be increased. In combination with the second embodiment, by electrically connecting the capacitor line 3b to the first light-shielding film 11a' and the second barrier layer 90b, the capacitor line for forming storage capacitance may be constructed as a triple wiring. When the capacitor line 3b as the storage capacitor electrode is formed like an island for each pixel, the first light-shielding film 11a' and the second barrier layer 90b are electrically connected to each other through the storage capacitor electrode and also connected to the adjacent pixels. Additionally, by opening the contact hole 15 and a contact hole 8c for connecting the second barrier layer 80b to the capacitor line 3b at different planar positions, poor connections at the contact hole 15 and the contact hole 8c can be avoided.

Furthermore, as shown in FIGS. 14 and 15, a TFT array substrate 10' is provided with a recess at least in a portion of a wiring and a TFT 30, and upper surface is planarized. Consequently, the surface of a third interlayer insulating film 7 in the planar region in which wiring such as a data line 6a, a scanning line 3a, the capacitor line 3b, etc. and the TFT 30 are formed is planarized. The other constructions are the same as those in the first embodiment.

Accordingly; in the fourth embodiment, a difference in level between the region in which the scanning line 3a, the TFT 30, the capacitor line 3b, etc., overlapping the data line 6a are formed and the pixel-aperture region is reduced. Since the pixel electrode 9a is thus planarized, the disclination of a liquid crystal layer 50 can be reduced in accordance with the degree of the planarization. As a result, a higher resolution image can be displayed and also the pixel-aperture region can be enlarged.

Additionally, instead of the planarization by the recess provided in the TFT array substrate 10', planarization may be performed, for example, by CMP (chemical mechanical polishing) treatment, spin-coating treatment, a reflow method, or a second interlayer insulating film 4 and a third interlayer insulating film 7 may be planarized by using an organic SOG (spin on glass) film, an inorganic SOG film, a polyimide film, or the like. Additionally, the construction described above is also applicable to the first embodiment, the second embodiment, and the third embodiment.

General Structure of Electro-optical Device

Figure 16:
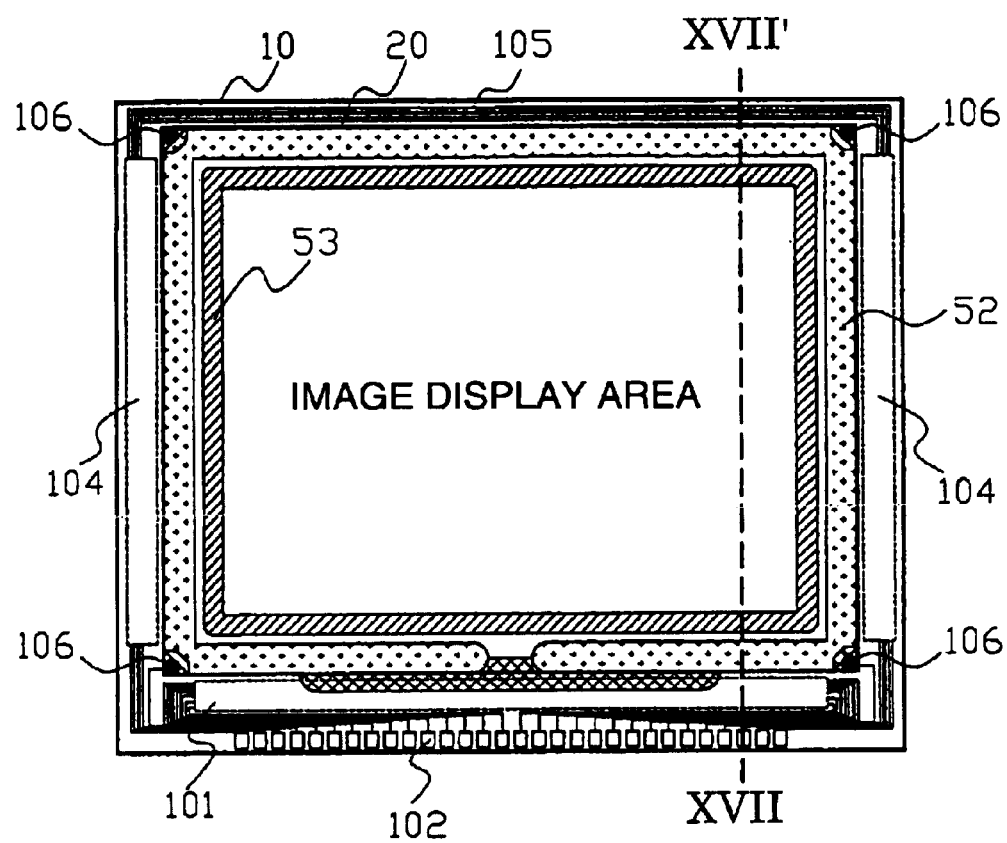
FIG. 16 is a plan view of the TFT array substrate provided with the elements formed thereon in the electro-optical device in each embodiment, viewed from the side of the counter substrate.
Figure 17:
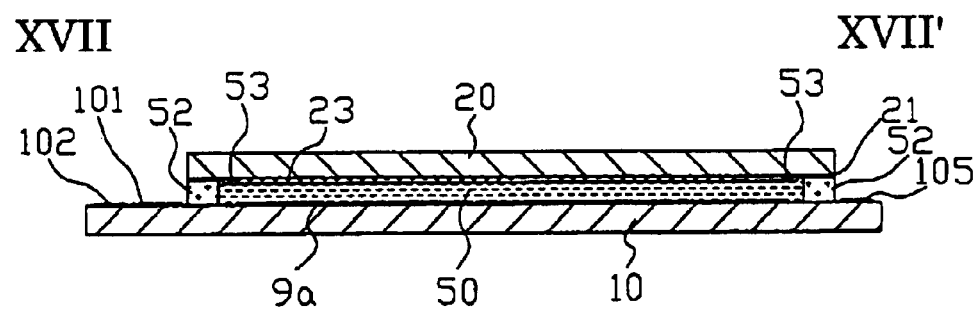
FIG. 17 is a sectional view taken along the line XVII–XVII' of FIG. 16.

The general structure of the electro-optical device constructed as described above in each embodiment will be described with reference to FIGS. 16 and 17. FIG. 16 is a plan view of the TFT array substrate 10 provided with the elements formed thereon, viewed from the side of the counter substrate 20, and FIG. 17 is a sectional view taken along the line XVII–XVII' of FIG. 16.

In FIG. 16, on the TFT array 10, a sealing material 52 is provided along the edge, and a third light-shielding film 53, which is composed of the same material as or a different material from that of the second light-shielding film 23, as a frame for delimiting the periphery of the image display area is provided in parallel interior to the sealing material 52. In the region exterior to the sealing material 52, a data line drive circuit 101 for driving the data lines 6a by supplying image signals to the data lines 6a with predetermined timing and an external circuit-connecting terminal 102 are provided along one side of the TFT array substrate 10, and scanning line drive circuits 104 for driving the scanning lines 3a by supplying scanning signals to the scanning lines 3a with predetermined timing are provided along two sides adjacent to the above side. If a delay of scanning signals transmitted to the scanning lines 3a is not a problem, the scanning line drive circuit 104 may be disposed on one side only. The data line drive circuit 101 may be placed on both sides along the sides of the image display area For example, data lines in odd columns may be supplied with image signals from a data line drive circuit placed along one side of the image display area, and data lines in even columns may be supplied with image signals from a data line drive circuit placed along the opposite side of the image display area. If data lines are driven like a comb as described above, the area occupied by the data line drive circuit can be expanded, enabling the construction of a complex circuit. Furthermore, on the remaining side of the TFT array substrate 10, a plurality of wirings 105 for connecting the scanning line drive circuits 104 provided on both sides of the image display area to each other are provided. A conducting material 106 for electrically conducting the TFT array substrate 10 and the counter substrate 20 to each other is provided in at least one section of each corner of the counter substrate 20. As shown in FIG. 17, the counter substrate 20 having substantially the same outline as that of the sealing material 52 shown in FIG. 16 is bonded to the TFT array substrate 10 with the sealing material 52. Additionally, on the TFT array substrate 10, in addition to the data line drive circuit 101, the scanning line drive circuit 104, etc., a sampling circuit for applying image signals to a plurality of data lines 6a with predetermined timing, a precharge circuit for supplying precharge signals with a predetermined voltage level to each of the plurality of data lines 6a prior to image signals, a testing circuit for testing the quality, defects, etc. of the electro-optical device during the fabrication and delivery, and so on may be provided. Additionally, in accordance with the embodiments, the second light-shielding film 23, which is smaller than the light-shielding region on the TFT array substrate 10, is formed on the counter substrate 20, and can be easily removed depending on the application of the electro-optical device.

In the individual embodiments described with reference to FIGS. 1 to 17, instead forming the data line drive circuit 101 and the scanning line drive circuit 104 on the TFT array substrate 10, for example, a driving LSI mounted on a TAB (tape automated bonding) substrate may be electrically and mechanically connected through an anisotropic conductive film provided in the periphery of the TFT array substrate 10. Additionally, on the side of the counter substrate 20 into which projected light enters or on the side of the TFT array substrate 10 from which outgoing light is emitted, a polarizing film, a retardation film, a polarizer, and so on may be disposed in a predetermined direction depending the performance modes, such as a TN (twisted nematic) mode, a VA (vertically aligned) mode, and a PDLC (polymer dispersed liquid crystal) mode, or a "normally white mode/normally black mode".

The electro-optical devices in the individual embodiments described above are applicable to a projector, in which three electro-optical devices are used, each as a light valve for R, G, and B, and each color light separated by a dichroic mirror for separating each color of R, G, and B enters into each light valve as projected light. Therefore, in the individual embodiments, color filters are not provided on the counter substrate 20. However, color filters for R, G, and B together with protective films therefor may be formed on the counter substrate 20 in the predetermined region facing the pixel electrodes 9a in which the second light-shielding film 23 is not formed. In this way, the electro-optical devices of the individual embodiments can be used for color electro-optical devices of a direct-view-type and of a reflection type besides liquid crystal projectors. Furthermore, the counter substrate 20 may be provided with a microlens corresponding to each pixel. Alternatively, a color filter layer composed of a color resist or the like may be formed below the pixel electrode 9a corresponding to each of R, G, and B on the TFT array substrate 10. In this way, the condensing efficiency of incident light can be improved and a bright electro-optical device can be obtained. Furthermore, a dichroic filter for producing colors R, G, and B using interference of light may be formed by depositing a number of interference layers having different refractive indices on the counter substrate 20. By using the counter substrate provided with the dichroic filter, a brighter color electro-optical device can be obtained.

In the electro-optical devices in the embodiments described above, incident light enters from the side of the counter substrate 20 as has been done conventionally. However, since the first light-shielding film 11a (or 11a') is provided, a structure may be employed in which incident light enters from the side of the TFT array substrate 10 and is emitted from the side of the counter substrate 20. That is, even if the electro-optical device is mounted on a projector, it is possible to prevent light from entering into the channel region 1a', the low-concentration source region 1b, and the low-concentration drain region 1c of the semiconductor layer 1a, and thus a high resolution image can be displayed. Conventionally, in order to prevent the reflection at the back side of the TFT array substrate 10, a polarizer which is AR (antireflection) coated for preventing reflection is separately placed, or an AR film is attached. In contrast, in the embodiments, since the first light-shielding film 11a (or 11a') is formed between the surface of the TFT array substrate 10 and at least the channel region 1a', the low-concentration source region 1b, and the low-concentration drain region 1c of the semiconductor layer 1a, it is not required to use such an AR-coated polarizer or an AR film or to use a TFT substrate 10 which is AR-treated. Therefore, in the embodiments, the material cost can be reduced, and the yield is not decreased due to dirt, defects, etc. caused when polarizers are attached, which is very advantageous. Additionally, because of highly excellent light resistance, even if a bright light source is used, or the light utilization efficiency is improved by the polarization conversion using a polarization beam splitter, deterioration in image quality by light, such as cross talk, does not occur.

With respect to the switching element provided on each pixel, although a staggered or coplanar polysilicon TFT has been described, the embodiments are also applicable to TFTs of other structures, such as an inverted-staggered TFT and an amorphous silicon TFT.

Electronic Apparatus

Next, examples of an electronic apparatus provided with an electro-optical device 100, which has been described above in detail will be described with reference to FIGS. 18 to 20.

Figure 18:
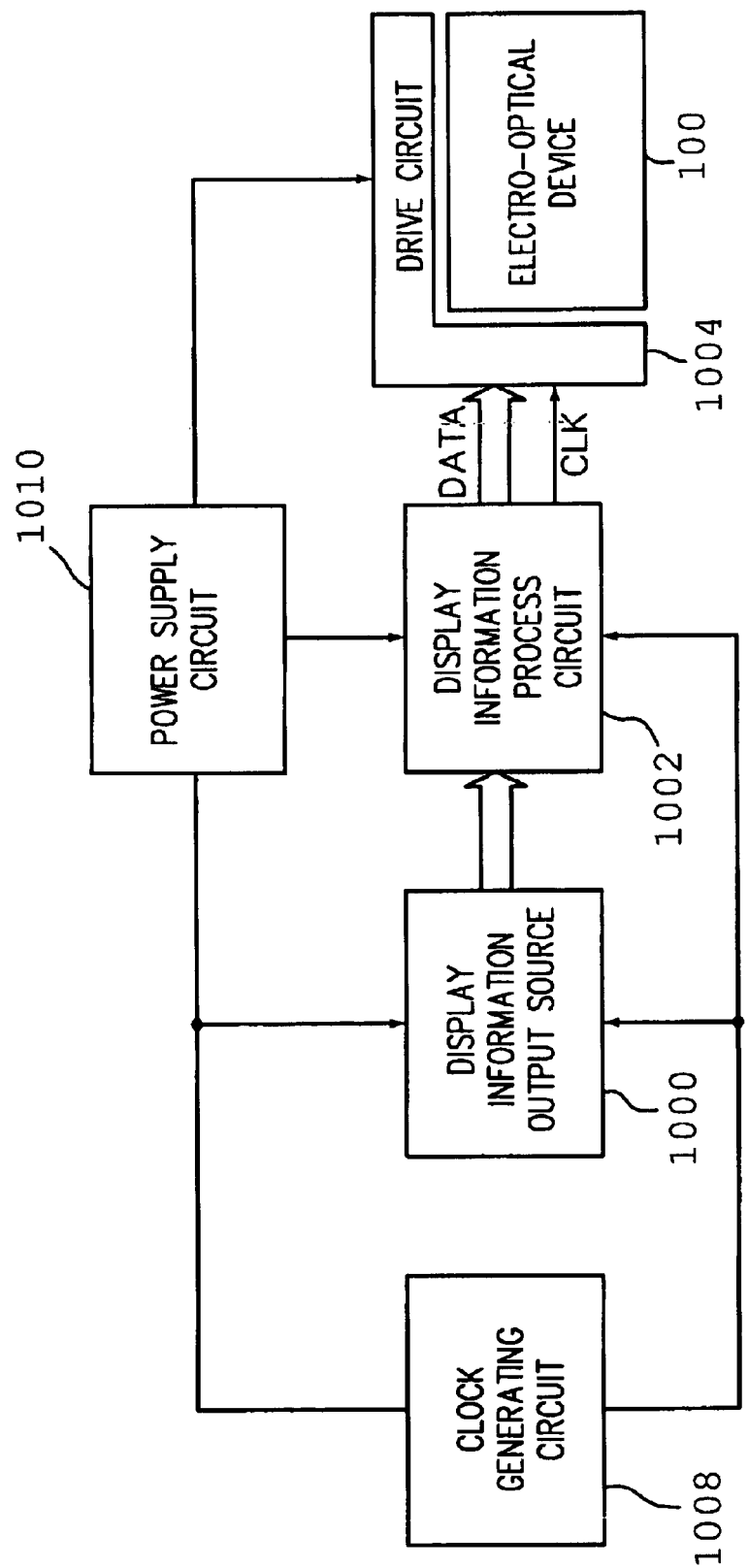
FIG. 18 is a block diagram which schematically shows the structure of an electronic apparatus as an embodiment of the present invention.

FIG. 18 is a diagram which shows the schematic structure of an electronic apparatus provided with the electro-optical device 100.

In FIG. 18, the electronic apparatus includes a display information output source 1000, a display information process circuit 1002, a drive circuit 1004, the electro-optical device 100, a clock generating circuit 1008, and a power supply circuit 1010. The display information output source 1000, which includes a memory such as ROM (read only memory), RAM (random access memory), and an optical disk device, and a tuning circuit in which image signals are tuned and output, outputs display information such as image signals having a predetermined format to the display information process circuit 1002 based on clock signals from the clock generating circuit 1008. The display information process circuit 1002, which includes various known process circuits such as an amplifying polarity-inverting circuit, a serial-parallel conversion circuit, a rotation circuit, a gamma correction circuit, and a clamp circuit, produces digital signals in sequence from the display information input based on clock signals and outputs the digital signals together with clock signals CLK to the drive circuit 1004. The drive circuit 1004 drives the electro-optical device 100. The power supply circuit 1010 supplies predetermined power to the individual circuits described above. The drive circuit 1004 may be mounted on a TFT array substrate constituting the electro-optical device 100, and in addition thereto the display information process circuit 1002 may be mounted.

Next, specific examples of an electronic apparatus constructed as described above are shown in FIGS. 19 and 20.

Figure 19:
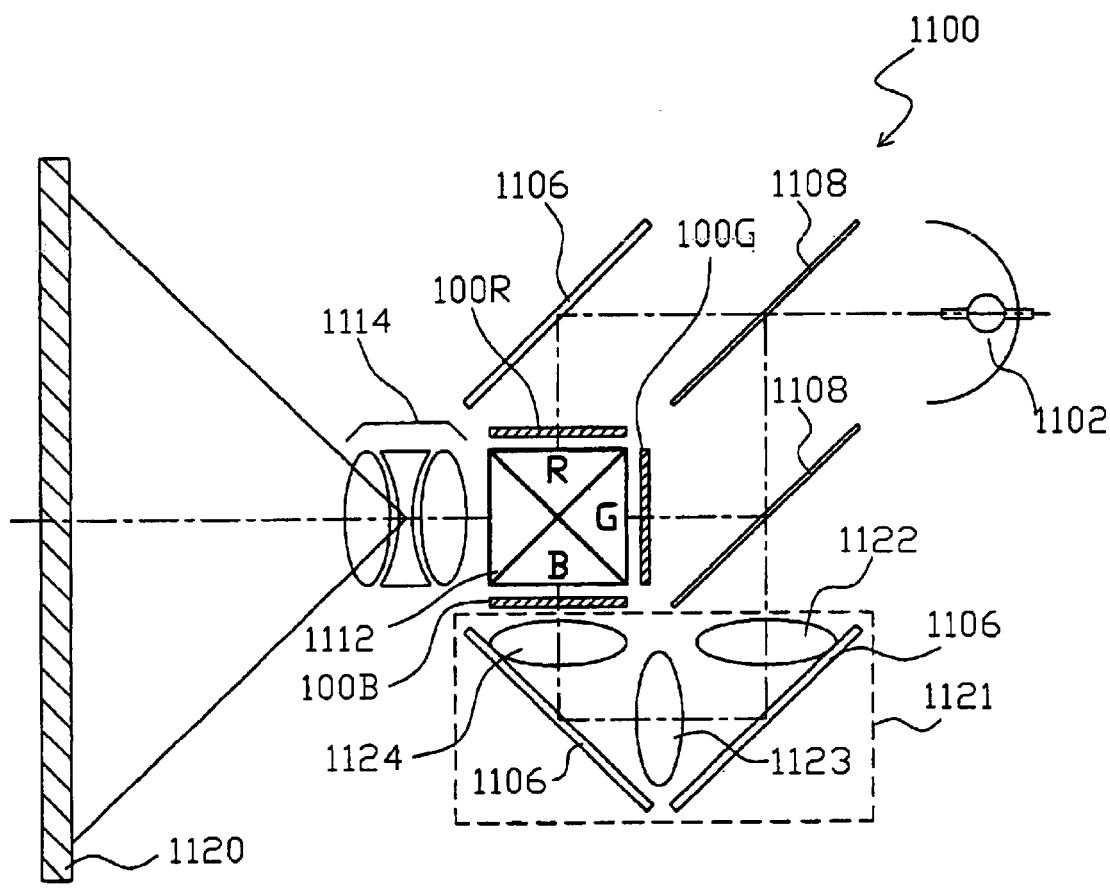
FIG. 19 is a sectional view of a projector as an example of an electronic apparatus.

In a projector 1100, as an example of an electronic apparatus, shown in FIG. 19, three light valves, each including the electro-optical device 100 in which the drive circuit 1004 is mounted on a TFT array substrate, are prepared and used as light valves 100R, 100G, and 100B for R, G, and B, respectively. In the projector 1100, when projected light is emitted from a lamp unit 1102 as a white light source, such as a metal halide lamp, it is separated into three light components R, G, and B corresponding to three primary colors R, G, and B by three mirrors 1106 and two dichroic mirrors 1108, and the three light components are guided to the corresponding light valves 100R, 100G, and 100B. At this stage, in order to prevent light loss due to a long light path, the light component B is guided through a relay lens system 1121 which includes an incident side lens 1122, a relay lens 1123, and an emitting side lens 1124. The light components corresponding to the three primary colors modulated by the light valves, 100R, 100G, and 100B, respectively, are recombined by a dichroic prism 1112, and then, as a color image, are projected to a screen 1120 through a projection lens 1114.

Figure 20:
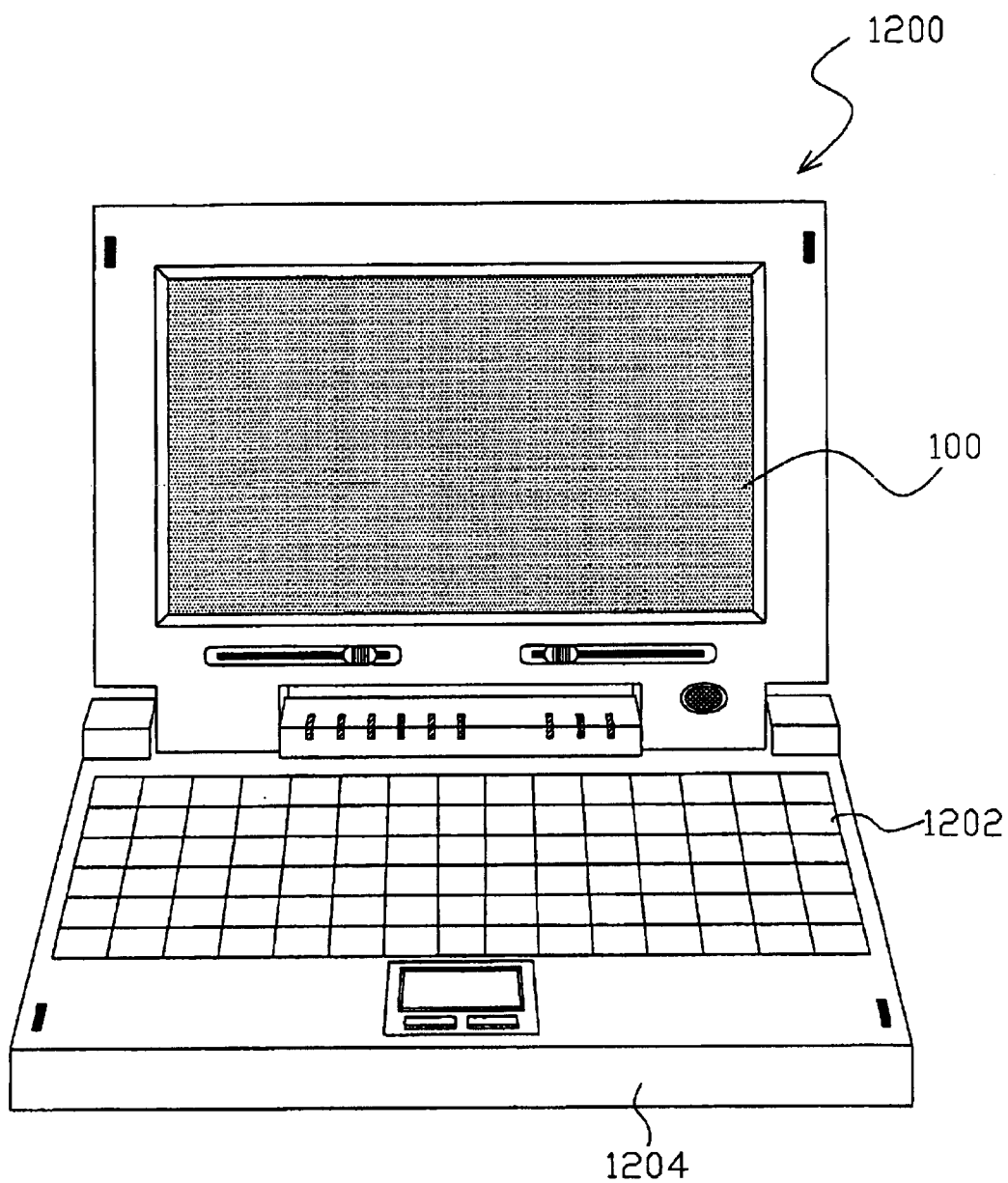
FIG. 20 is a front view of a personal computer as another example of an electronic apparatus.

In FIG. 20, a laptop personal computer (PC) 1200 for multimedia use, as another example of an electronic apparatus, is provided with the electro-optical device 100 described above in the top cover case, and also is provided with a body 1204 including a CPU, a memory, a modem, etc. and incorporated with a key board 1202.

In addition to the electronic apparatuses described with reference to FIGS. 19 to 20, examples of an electronic apparatus shown in FIG. 18 are a liquid crystal television, a viewfinder type or monitor-direct-view type video tape recorder, a car navigation apparatus, an electronic pocket diary, an electronic calculator, a word processor, an engineering workstation (EWS), a mobile telephone, a television telephone, a POS terminal, and an apparatus provided with a touch panel.

As described above, in accordance with the embodiments, various types of electronic apparatuses provided with electro-optical devices having high fabrication efficiency in which a high resolution image can be displayed are obtained.

What is claimed is:

1. An electro-optical device, comprising:
   a substrate;
   a plurality of scanning lines formed above the substrate;
   a plurality of data lines formed above the substrate and intersecting the plurality of scanning lines;
   a plurality of thin-film transistors, each thin-film transistor being disposed in correspondence with a respective one of intersections of the plurality of data lines and the plurality of scanning lines;
   a pixel electrode disposed with a corresponding thin-film transistor;
   a storage capacitor comprising a portion of a semiconductor layer of the thin-film transistor as a first storage capacitor electrode and a second storage capacitor electrode comprising a conductive film of a gate electrode of the thin-film transistor;
   a light shielding first conductive layer electrically connected between the semiconductor layer and the pixel electrode; and
   a second conductive layer comprising a film of the first conductive layer as a storage capacitor line, at least partially overlapping the data lines in a plan view, and electrically connected to the second storage capacitor electrode.

2. The electro-optical device according to claim 1, the second conductive layer at least partially overlapping the pixel electrode in a plan view.

3. The electro-optical device according to claim 1, the first conductive layer being electrically connected to the semiconductor layer through a first contact hole and is electrically connected to the pixel electrode through a second contact hole.

4. The electro-optical device according to claim 1, the data lines being electrically connected to the semiconductor layer through a third contact hole.

5. The electro-optical device according to claim 1, the data lines not at least partially overlapping the pixel electrode in a plan view.

6. The electro-optical device according to claim 1, the second conductive layer being electrically connected to a constant-potential line.

7. The electro-optical device according to claim 1, further comprising a light-shielding film formed on the substrate side of at least a channel region of the semiconductor layer with an underlying insulating film therebetween.

8. The electro-optical device according to claim 1, the first conductive layer and the second conductive layer comprising a high-melting point metal.

9. The electro-optical device according to claim 1, the second conductive layer and the data lines being at least partially disposed opposite to each other with an interlayer insulating film therebetween.

10. The electro-optical device according to claim 3, the second conductive layer being electrically connected to the second storage capacitor electrode through a fourth contact hole, and the fourth contact hole being opened when opening the first contact hole.

11. The electro-optical device according to claim 1, the second conductive layer being shaped like an island in a plan view and at least partially delimiting a region along the data lines in a pixel-aperture region.

12. The electro-optical device according to claim 1, the second conductive layer being formed like a grid excluding a region in which the first conductive layer is present in a plan view and delimiting regions along the data lines and the scanning lines in the pixel-aperture region.

13. The electro-optical device according to claim 1, the semiconductor layer and the first conductive layer being connected to each other with an interconnecting conductive layer comprising a film comprising the data lines therebetween.

14. A method for fabricating an electro-optical device comprising a substrate, a plurality of scanning lines, a plurality of data lines, a thin-film transistor including a gate electrode and disposed in correspondence with intersections of the plurality of data lines and the plurality of scanning lines, and a pixel electrode disposed in correspondence with the thin-film transistor, the method comprising the steps of:
   forming a semiconductor layer for producing a source region, a channel region, and a drain region on the substrate;
   forming an insulating thin film on the semiconductor layer;
   forming the gate electrode and one electrode of a storage capacitor on the insulating thin film;
   forming a first interlayer insulating film on the gate electrode and the one electrode of the storage capacitor;
   making a first contact hole leading to the semiconductor layer in the first interlayer insulating film;
   forming the data lines on the first interlayer insulating film and simultaneously forming an interconnecting conductive layer comprising a film comprising the data lines so as to be electrically connected to the semiconductor layer through the first contact hole;
   forming a second interlayer insulating film on the data lines and the interconnecting conductive layer;
   making a second contact hole leading to the interconnecting conductive layer in the second interlayer insulating film;
   making a third contact hole leading to the electrode of the storage capacitor in the second interlayer insulating film;
   forming a light-shielding first conductive film on the second interlayer insulating film so as to be electrically connected to the interconnecting conductive layer through the second contact hole, and simultaneously forming a second conductive layer comprising a film of conductive layer disposed on the second interlayer insulating film as a storage capacitor line so as to be electrically connected to the one electrode of a storage capacitor through the third contact hole and overlap the data lines in a plan view;
   forming a third interlayer insulating film on the first conductive layer and the second conductive layer;
   making a fourth contact hole leading to the first conductive layer in the third interlayer insulating film; and
   forming the pixel electrode so as to be electrically connected to the first conductive layer through the fourth contact hole.

15. The method for fabricating an electro-optical device according to claim 14, further comprising the step of:
   making a fifth contact hole leading to the semiconductor layer in the first interlayer insulating film after the step of forming the first interlayer insulating film, in the step of forming the data lines, the data lines being formed so as to be electrically connected to the semiconductor layer through the fifth contact hole.

16. An electronic apparatus comprising the electro-optical device according to claim 1.

17. The electro-optical device according to claim 1, the first conductive layer and the second conductive layer being formed with a same film.

18. The electro-optical device according to claim 1, the second storage capacitor electrode being shaped like an island as viewed in plan.

19. The electro-optical device according to claim 1, the second conductive layer being disposed at least partially above the data lines.

20. An electro-optical device comprising:
   a substrate;
   a plurality of scanning lines formed above the substrate;
   a plurality of data lines formed above the substrate and intersecting the plurality of scanning lines;
   a plurality of thin-film transistors, each thin-film transistor being disposed in correspondence with a respective one of intersections of the plurality of data lines and the plurality of scanning lines, each transistor including a semiconductor layer;
   a storage capacitor including:
      a first storage capacitor electrode formed from a portion of the semiconductor layer of a corresponding thin-film transistor,
      a second storage capacitor electrode, and
      an insulating thin film interposed between the first storage capacitor electrode and the second storage capacitor electrode; and
   a light-shielding conductive layer, as a storage capacitor line, electrically connected to the second storage capacitor electrode.

21. The electro-optical device according to claim 20, the light-shielding conductive layer at least partially overlapping the data lines as viewed in plan.

22. The electro-optical device according to claim 20, the storage capacitor electrode being shaped like an island as viewed in plan.

23. The electro-optical device according to claim 20, the light-shielding conductive layer being disposed at least partially above the data lines.

24. The electro-optical device according to claim 20, the light-shielding conductive layer being formed like a grid.

25. The electro-optical device according to claim 20, the light-shielding conductor layer being formed in a grid shape excluding a region, and further comprising:
   a pixel electrode disposed with a corresponding thin-film transistor; and
   a second conductor layer electrically connected to the semiconductor layer and the pixel electrode through the region.

26. A method for fabricating an electro-optical device comprising a substrate, a plurality of scanning lines, a plurality of data lines, and a thin-film transistor disposed in correspondence with intersections of the plurality of data lines and the plurality of scanning lines, the method comprising:
   forming a semiconductor layer for producing a source region, a channel region, a drain region, and a first storage capacitor electrode on the substrate;
   forming an insulating thin film on the semiconductor layer;
   forming a second storage capacitor electrode on the insulating thin film in opposition to the first storage capacitor electrode;
   forming an interlayer insulating film above the second storage capacitor electrode;
   making a contact leading to the second storage capacitor electrode in the interlayer insulating film; and
   forming a light-shielding first conductive film on the interlayer insulating film and into the contact hole as a storage capacitor line electrically connected to the second storage capacitor electrode through the contact hole.

* * * * *

UNITED STATES PATENT AND TRADEMARK OFFICE
CERTIFICATE OF CORRECTION

PATENT NO. : 6,850,292 B1
DATED : February 1, 2005
INVENTOR(S) : Masao Murade

It is certified that error appears in the above-identified patent and that said Letters Patent is hereby corrected as shown below:

<u>Title page,</u>
Item [22], PCT Date, please change "Dec. 27, 1998" to -- Dec. 27, 1999 --.

Signed and Sealed this

Seventeenth Day of May, 2005

JON W. DUDAS
*Director of the United States Patent and Trademark Office*